United States Patent
Da Silva et al.

(10) Patent No.: US 11,283,501 B2
(45) Date of Patent: Mar. 22, 2022

(54) METHODS AND APPARATUS RELATING TO A WIRELESS COMMUNICATION NETWORK THAT UTILISES BEAMFORMING

(71) Applicant: Telefonaktiebolaget LM Ericsson (publ), Stockholm (SE)

(72) Inventors: Icaro Leonardo Jeronimo Da Silva, Stockholm (SE); Igor Moaco Guerreiro, Fortaleza (BR); Victor Farias Monteiro, Fortaleza (BR)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 17/257,774

(22) PCT Filed: Jul. 7, 2018

(86) PCT No.: PCT/EP2018/068453
§ 371 (c)(1),
(2) Date: Jan. 4, 2021

(87) PCT Pub. No.: WO2020/011330
PCT Pub. Date: Jan. 16, 2020

(65) Prior Publication Data
US 2021/0297129 A1    Sep. 23, 2021

(51) Int. Cl.
*H04L 1/02* (2006.01)
*H04B 7/06* (2006.01)
(Continued)

(52) U.S. Cl.
CPC ......... *H04B 7/0617* (2013.01); *H04B 7/0695* (2013.01); *H04B 7/088* (2013.01);
(Continued)

(58) Field of Classification Search
CPC ..... H04L 1/0618; H04L 1/06; H04L 43/0852; H04W 24/00; H04W 24/10; H04W 76/27; H04W 16/28; H04W 72/085
(Continued)

(56) References Cited

U.S. PATENT DOCUMENTS

2013/0005382 A1    1/2013  Landstrom et al.
2013/0300604 A1*  11/2013  Lopez ............... H01Q 1/246
                                                    342/372
(Continued)

FOREIGN PATENT DOCUMENTS

WO        2018085601 A1    5/2018

OTHER PUBLICATIONS

International Search Report and Written Opinion dated Mar. 15, 2019 for International Application No. PCT/EP2018/068453 filed on Jul. 7, 2018, consisting of 11-pages.
(Continued)

*Primary Examiner* — Khai Tran
(74) *Attorney, Agent, or Firm* — Christopher & Weisberg, P.A.

(57) ABSTRACT

An aspect of an embodiment provides a method for controlling channel quality monitoring in a wireless communication system that utilises beamforming, whereby a plurality of signals are transmitted from a base station to a user equipment and the quality of a received signal is measured at the user equipment for each of the plurality of signals, each of the plurality of signals being transmitted by the base station utilising a different frequency sub-band and beam pairing. The method includes: identifying plural frequency sub-band and beam pairings for which the received signal quality is correlated; and, for each frequency sub-band and beam pairing within a group of plural frequency sub-band and beam pairings for which the received signal quality is
(Continued)

correlated, evaluating the periodicity of a received signal quality analysis process, and determining whether or not to adjust the periodicity.

20 Claims, 15 Drawing Sheets

(51) Int. Cl.
   *H04B 7/08* (2006.01)
   *H04L 5/00* (2006.01)
   *H04B 7/0408* (2017.01)

(52) U.S. Cl.
   CPC .............. *H04L 5/001* (2013.01); *H04L 5/006* (2013.01); *H04L 5/0023* (2013.01); *H04L 5/0048* (2013.01); *H04L 5/0082* (2013.01); *H04B 7/0408* (2013.01)

(58) Field of Classification Search
   USPC .................................................. 375/267, 260
   See application file for complete search history.

(56) References Cited

U.S. PATENT DOCUMENTS

2018/0269950 A1* 9/2018 John Wilson ........ H04B 7/0626
2020/0059290 A1* 2/2020 Pan ...................... H04B 17/327

OTHER PUBLICATIONS

3GPP TSG RAN WG1 Meeting #93 R1-1807128; Title: Further enhancements on CSI reporting and codebook design; Agenda Item: 7.1.2.2.6; Source: Huawei, HiSilicon; Document for: Discussion and Decision; Date and Location: May 21-25, 2018, Busan, Korea, consisting of 6-pages.

* cited by examiner

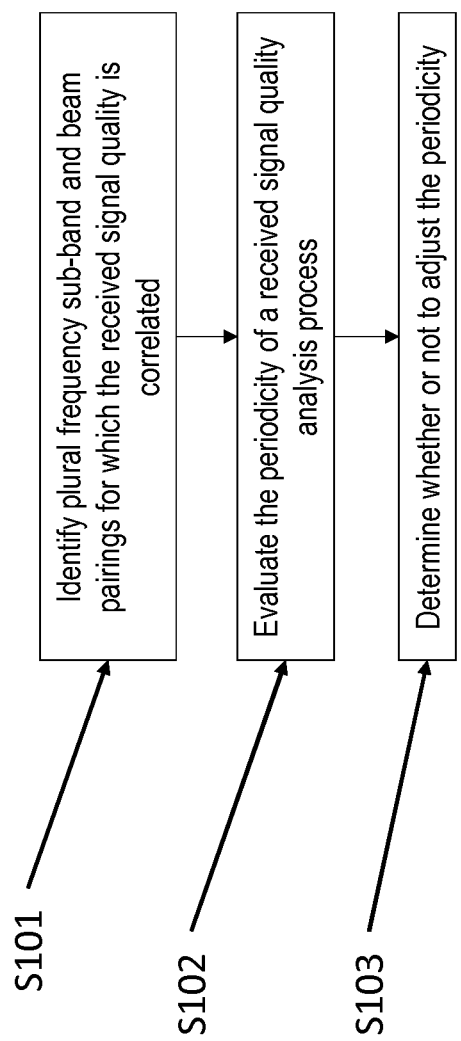

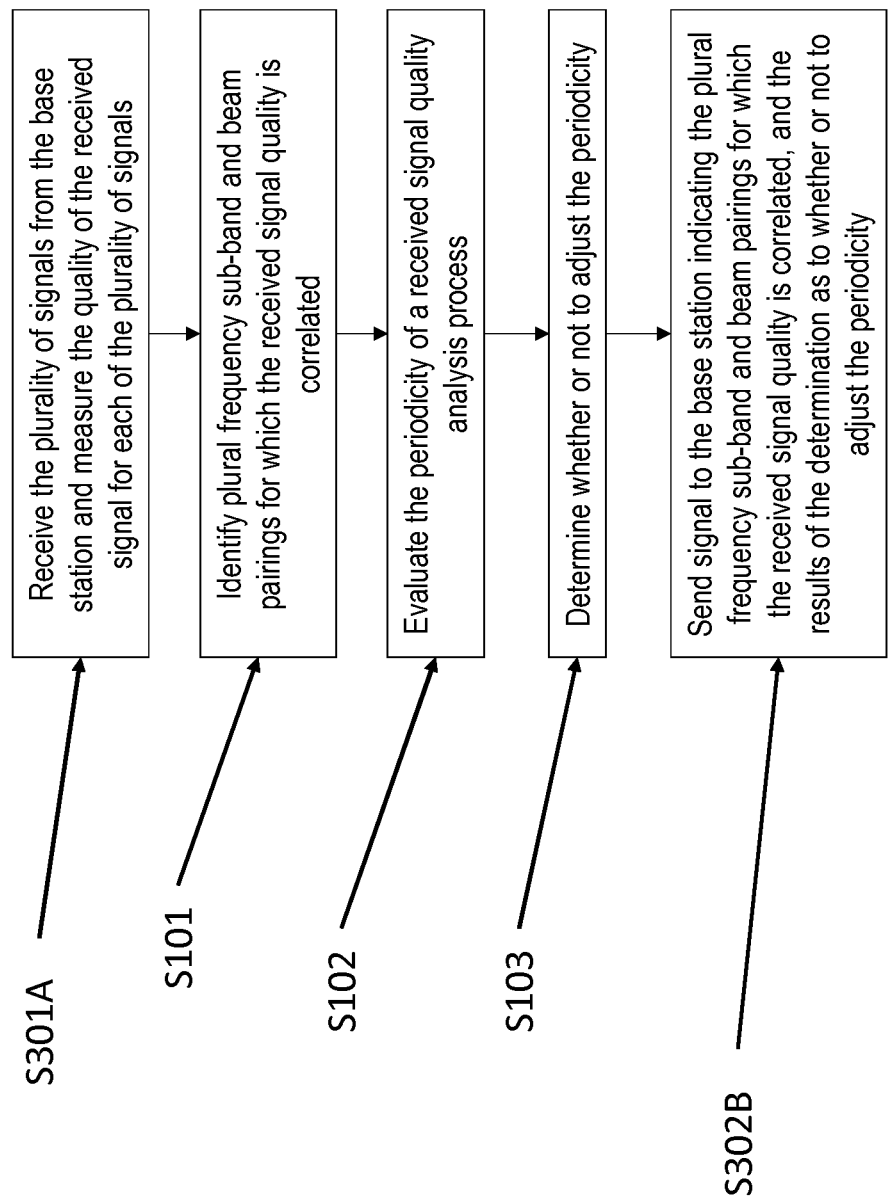

METHODS AND APPARATUS RELATING TO A WIRELESS COMMUNICATION NETWORK THAT UTILISES BEAMFORMING

CROSS-REFERENCE TO RELATED APPLICATIONS

This application is a Submission Under 35 U.S.C. § 371 for U.S. National Stage Patent Application of International Application Number: PCT/EP2018/068453, filed Jul. 7, 2018 entitled "METHODS AND APPARATUS RELATING TO A WIRELESS COMMUNICATION NETWORK THAT UTILISES BEAMFORMING," the entirety of which is incorporated herein by reference.

TECHNICAL FIELD

Embodiments of the present disclosure relate to methods and apparatus in wireless communication networks, and particularly to methods and apparatus relating to a wireless communication network that utilises beamforming.

BACKGROUND

In Long Term Evolution (LTE), a wireless communication network (hereinafter also referred to as a "network") may configure User Equipment (UE) to report to its serving network node/base station the quality of one or more frequency sub-bands associated with a given serving cell, that is, a given Primary Cell (PCell), Primary Secondary Cell (PSCell) or their associated Secondary Cells (SCells) used for transmission with different reporting modes supported. In this context, a channel quality indicator (CQI) may be used to indicate channel quality, and may be used by the network to determine a suitable modulation and coding scheme to be used with the UE. In this way, link adaptation may be performed by the network, whereby the network may utilise adaptive modulation and coding to adapt to variations in channel conditions and maintain a reliable communication link with the UE When reporting channel quality (for example, using CQIs), various different reporting modes may be utilised. A common reporting mode that may be utilised is a wideband reporting mode, in which a single CQI report is provided to indicate the quality of the entire system bandwidth associated with a given cell for which the quality is being reported. Wideband reporting provides the lowest level of report granularity; reporting the quality of the entire bandwidth using a single report. Other reporting modes may be used to provide higher levels of CQI report granularity. For example, the network can split the system bandwidth into a set of frequency sub-bands and configure the UE to report CQI(s) for each sub-band, or for a subset of sub-bands.

In LTE, the choice of a reporting mode utilised by a UE is determined by the network. Typically, the selection of reporting mode is determined, at least in part, by known levels of frequency dependence of the transmission quality. As an example of this, to obtain a more detailed CQI report in a frequency-selective channel (where the quality of the channel is dependent on the transmission frequency used), the system bandwidth could be split into sub-bands and a UE configured to provide a CQI report for each sub-band; this reporting mode may be referred to as a frequency-selective reporting mode. Alternatively, when the network has insights that channel can be flat in the frequency domain (such that the quality of the channel is not dependent on the transmission frequency used), a wideband reporting mode may be used.

LTE wireless communication networks are commonly configured to utilise the lowest level of report granularity that will provide adequate channel quality information, because lower granularity reporting is less demanding for the UEs in terms of the numbers of measurements and/or reports required, leading to lower battery power consumption in the UEs.

US 2013/0005382 A1 (hereinafter U.S. '382) discloses a system by which a base station or other controlling node within an LTE wireless communication network may determine which reporting mode should be used by individual users among a plurality of active users being supported by a network. In particular, the system allows a determination to be made as to whether frequency-selective reporting should be used, on a user by user basis. If it is determined that frequency-selective reporting should be used for a given user, a further determination is made as to whether the given user should report a frequency-selective channel quality indicator or a frequency-selective precoder matrix indicator.

Recent developments in wireless communication networks, such as 5G networks, are intended to facilitate the use of beamforming. In particular, the 5G radio interface currently being standardized in 3GPP, called New Radio (NR), has been designed taking into consideration that physical channels (PDCCH, PDSCH, PUCCH, etc.) and reference signals for control plane procedures (such as measurements for mobility, link adaptation, channel status reporting, etc.) may utilise beamforming.

In systems configured to implement beamforming, multiple antenna elements are used to form narrow beams, such that transmissions are spatial direction dependent (rather than being omnidirectional), in addition to other dependencies such as frequency dependencies. Beamforming facilitates improvements in both data rates and capacity. Beamforming efficiently enables the very wide transmission bandwidths needed for multi-Gb/s data rates; whereby the range of operation might not only range to frequencies below 6 GHz (currently used for LTE) but also higher frequencies up to approximately 100 GHz. The operation in higher frequencies is one of the drivers for beamforming based wireless communication networks, since high frequencies make it possible to use smaller antenna elements enabling deployments of larger antenna arrays.

With the use of higher frequencies as discussed above, propagation conditions can have increasing impacts on channel quality. This is because increasing frequency results in lower diffraction and higher outdoor/indoor penetration losses, so that signals will have less ability to propagate around corners and penetrate walls. In addition, atmospheric/rain attenuation and higher body losses could also reduce channel quality.

In wireless communication systems utilising beamforming, the spatial coverage of some beams may be comparatively narrow. As such, the channel quality may be highly dependent on physical position (including how clear the line of sight between a base station and UE is), and the variation in channel quality with changes in time and frequency may be very low or even non-existent. That is, the overall channel response may be "flat" in time and frequency domains. The use of narrow beams may act as a spatial filter (with narrow spatial bandwidth). This is because the different beams are transmitted from different antennas at different angles, thereby allowing different beams to be selected based on positioning of a receiving antenna. The narrower the beam the flatter the channel response is in general. This effect may be referred to as channel hardening.

As a result of the use of beamforming, channel quality may be dependent upon which beam is used in a transmission between two network nodes (such as a base station and UE), in addition to potential dependencies on other variables (notably transmission frequency). The use of beamforming may therefore result in a substantial increase in the number of channel quality reports that it is necessary to obtain in order to adequately characterise the quality of a link between two network nodes.

U.S. '382 discloses a method that can be performed at network node in an LTE wireless communication system to decide whether or not a frequency selective reporting mode should be used. The method of U.S. '382 is intended for use with omnidirectional transmissions, and does not consider the use of beamforming. As discussed above, in wireless communication systems using beamforming, channel quality reporting (such as CQI or CSI reporting) could be configured per transmitted beam and could even vary depending on the Rx beam used by the UE to perform measurements. Accordingly, the application of the U.S. '382 disclosure to wireless communication systems using beamforming would result in very large numbers of channel quality measurements (and reports) being required, with clear implications for the battery life of UEs and the amount of the UE operational time devoted to channel quality reporting rather than transmission of, for example, user data. Further, considering the dynamics of beamforming, the channel conditions might have changed after the network adapts the reporting mechanism.

SUMMARY

It is an object of the present disclosure to facilitate more efficient channel quality reporting in a wireless communication system that utilises beamforming.

Embodiments of the disclosure aim to provide methods and network nodes, such as user equipments and base stations (e.g. eNodeBs or gNodeBs, or servers coupled to such base stations), that alleviate some or all of the problems identified above.

An aspect of the disclosure provides a method for controlling channel quality monitoring in a wireless communication system that utilises beamforming, whereby a plurality of signals are transmitted from a base station to a user equipment and a quality of a received signal is measured by the user equipment for each of the plurality of signals, each of the plurality of signals being transmitted by the base station utilising a frequency sub-band and beam pairing that is different to the frequency sub-band and beam pairings used by the other signals among the plurality of signals, the method comprising: identifying plural frequency sub-band and beam pairings for which the received signal quality is correlated; and for each frequency sub-band and beam pairing within a group of plural frequency sub-band and beam pairings for which the received signal quality is correlated, evaluating periodicity of a received signal quality analysis process, and determining whether or not to adjust the periodicity. By identifying frequency sub-band and beam pairings for which the received signal quality is correlated and evaluating the periodicity of a received signal quality analysis process for the correlated sub-band and beam pairings, the method can facilitate a reduction in the total number of received signal quality analysis processes that a UE is required to participate in, in particular, by reducing the number of transmissions required in order to monitor variations in channel quality with frequency and beam between network nodes. The method thereby potentially facilitates savings in processing time, transmission resources and power in a wireless communication system that utilises beamforming.

The method may further comprise measuring the received signal quality of the plural frequency and sub-band pairings over plural measuring periods; calculating a mean received signal quality for each frequency and sub-band pairing among the plural frequency and sub-band pairings; and comparing the calculated mean received signal qualities for the plural frequency and sub-band pairings to identify correlated mean received signal qualities. In particular, the mean received signal qualities may be identified as correlated when the mean received signal qualities are within a given standard deviation value of each other. In this way, the correlated mean received signal qualities may be easily identified, and the accurate detection of correlation may not be precluded by small fluctuations in received signal qualities.

The method may further comprise adjusting the periodicity of the received signal quality analysis process, wherein adjusting the periodicity of the received signal quality analysis process comprises: selecting a frequency sub-band and beam pairing which is representative of the plural frequency sub-band and beam pairings in the group for which the received signal quality is correlated; maintaining or reducing the time interval between measuring periods including received signal quality analysis processes for the selected representative frequency sub-band and beam pairing; and either increasing the time interval between measuring periods including received signal quality analysis processes for the plural frequency sub-band and beam pairings in the group other than the selected representative frequency sub-band and beam pairing, or stopping the received signal quality analysis processes for the plural frequency sub-band and beam pairings in the group other than the selected representative frequency sub-band and beam pairing. By altering the periodicity of the received signal quality analysis process, the method may provide transmission time and bandwidth savings, and also corresponding UE battery power savings where applicable. Further, the adjustment to the periodicity of the received signal quality analysis process may be varied between a total stop of reporting on the plural frequency sub-band and beam pairings in the group other than the selected representative frequency sub-band and beam pairing, and a reduction in how often the reporting takes place on the plural frequency sub-band and beam pairings in the group other than the selected representative frequency sub-band and beam pairing, to be tailored depending on the specific requirements of the wireless communication system.

The method may further specify that, in measuring periods in which the received signal quality analysis process of the plural frequency sub-band and beam pairings in the group other than the selected representative frequency sub-band and beam pairing does not occur: either the base station does not transmit a signal to the user equipment using the frequency sub-band and beam pairings for which the received signal quality analysis process is not to occur; or the base station does transmit the signal to the user equipment using the frequency sub-band and beam pairings for which the received signal quality analysis process is not to occur, and the user equipment: does not monitor the signal; or monitors the signal and sends a response indicating that the pairings remain part of the group, or does not send a response. Again, this allows the reporting on the plural frequency sub-band and beam pairings in the group other than the selected representative frequency sub-band and beam pairing to be tailored according to the specific requirements of a given wireless communication system, and also takes into consideration whether the method is implemented by a base station or user equipment.

The method may further specify that, if the received signal quality analysis process is performed for the plural frequency sub-band and beam pairings in the group other than the selected representative frequency sub-band and beam pairing, and indicates that the group of plural frequency sub-band and beam pairings are no longer correlated, or if the received signal quality for the representative frequency sub-band and beam pairing is monitored, and the variation in the received signal quality for the representative frequency sub-band and beam pairing exceeds a predetermined threshold, then the interval between received signal quality analysis processes for the plural frequency sub-band and beam pairings in the group other than the selected representative frequency sub-band and beam pairing is reduced to the same interval as the interval between received signal quality analysis processes for the selected representative frequency sub-band and beam pairing; the plural frequency sub-band and beam pairings are no longer identified as being correlated; and the process of identifying plural frequency sub-band and beam pairings for which the received signal quality is correlated is repeated. In this way, where a group of correlated plural frequency sub-band and beam pairings are found to no longer be correlated, or where the variation in the received signal quality indicates an unstable signal, the grouping can be disbanded such that the frequency sub-band and beam pairings are monitored with increased granularity and errors in estimates of the channel quality may be avoided.

A further aspect of the disclosure provides a base station for a wireless communication system that utilises beamforming, the base station comprising processing circuitry and a non-transitory machine-readable medium storing instructions which, when executed by the processing circuitry, cause the base station to: transmit a plurality of signals to a user equipment, each signal being transmitted by the base station utilising a frequency sub-band and beam pairing that is different to the frequency sub-band and beam pairings used by the other signals among the plurality of signals; receive reports of a quality of a received signal for each of the plurality of signals from the user equipment; identify plural frequency sub-band and beam pairings for which the received signal quality is correlated; for each frequency sub-band and beam pairing within a group of plural frequency sub-band and beam pairings for which the received signal quality is correlated, evaluate periodicity of the received signal quality analysis process, and determine whether or not to adjust the periodicity. A still further aspect of the disclosure provides a user equipment for a wireless communication system that utilises beamforming, the user equipment comprising processing circuitry and a non-transitory machine-readable medium storing instructions which, when executed by the processing circuitry, cause the user equipment to: receive, from a base station, a plurality of signals, each signal being transmitted by the base station utilising a frequency sub-band and beam pairing that is different to the frequency sub-band and beam pairings used by the other signals among the plurality of signals; measure a quality of a received signal for each of the plurality of signals; identify plural frequency sub-band and beam pairings for which the received signal quality is correlated; for each frequency sub-band and beam pairing within a group of plural frequency sub-band and beam pairings for which the received signal quality is correlated, evaluate periodicity of the received signal quality analysis process, and determine whether or not to adjust the periodicity. The base station and user equipment may be configured to provide the same benefits as discussed above in the context of the methods.

Further aspects provide apparatuses and machine-readable mediums comprising instructions for performing the methods set out above.

Note that the discussion below focuses on a technical solution for LTE and those networks intended to meet the requirements set out for the fifth generation (5G) of wireless systems, as defined by the Next Generation Mobile Networks Alliance. However, those skilled in the art will appreciate that it is also possible to apply the methods and apparatus described herein to other networks and access technologies. In other networks, network nodes, base stations, user equipments and other components may have different names.

BRIEF DESCRIPTION OF THE DRAWINGS

For a better understanding of the present disclosure, and to show how it may be put into effect, reference will now be made, by way of example, to the accompanying drawings, in which:

FIG. 1A shows a flowchart illustrating a method in accordance with an aspect of an embodiment;

FIGS. 3A and 3B show flowcharts illustrating further methods in accordance with aspects of embodiments;

DETAILED DESCRIPTION

Figure 1B:
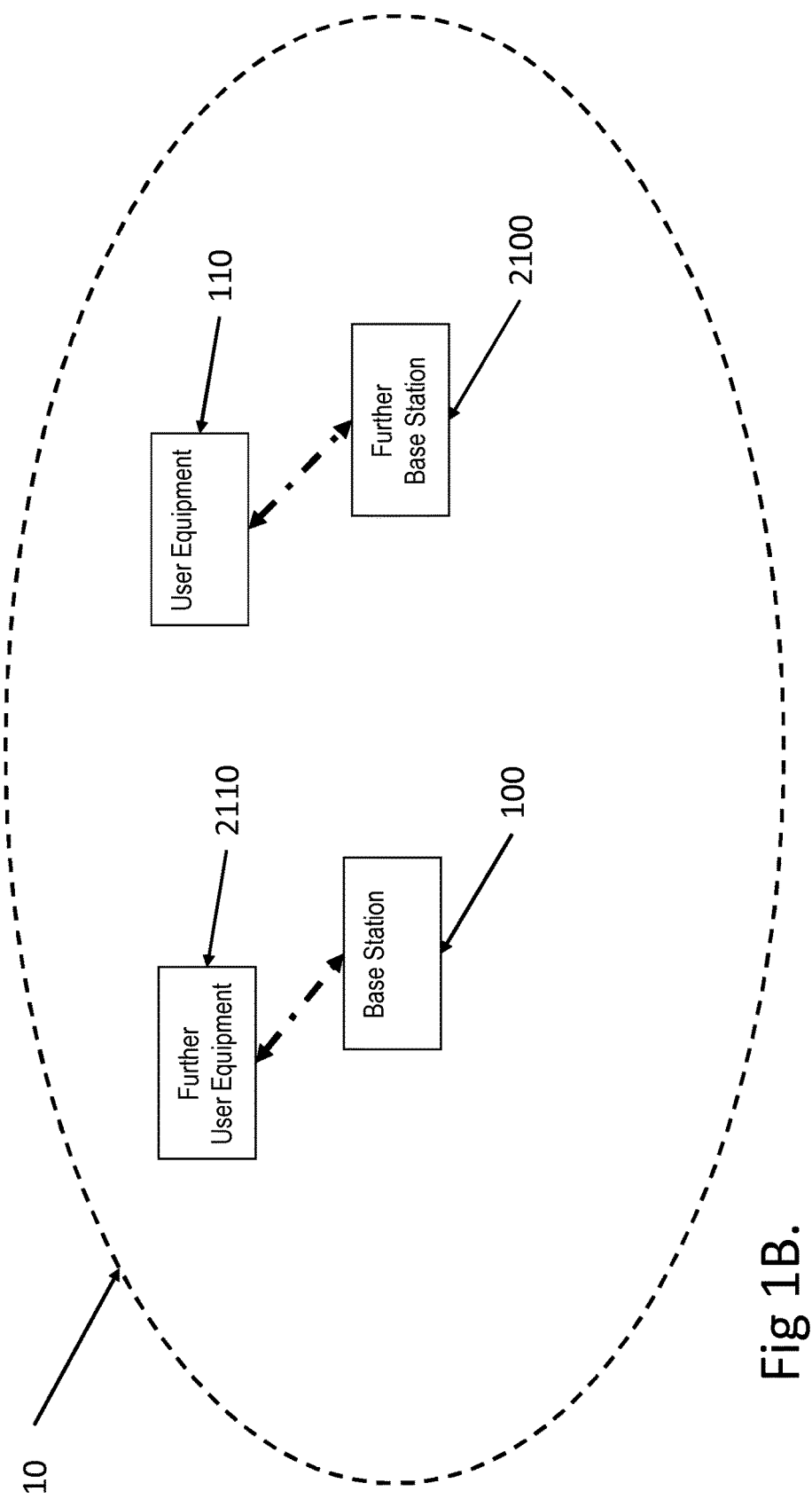
FIG. 1B shows schematic diagram of a wireless communication system in accordance with an aspect of an embodiment.

The following sets forth specific details, such as particular embodiments for purposes of explanation and not limitation. It will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for a terminal device, or user equipment (UE), it should be understood by those skilled in the art that "UE" is a non-limiting term comprising any mobile or wireless device, terminal or node equipped with a radio interface allowing for at least one of: transmitting signals in uplink (UL) and receiving and/or measuring signals in downlink (DL).

A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the terms "mobile station" ("MS"), "mobile device", "terminal device" and "wireless terminal device" may be used interchangeably in the following description, and it will be appreciated that such a device does not necessarily have to be 'mobile' in the sense that it is carried by a user. Examples of UE are target device, device to device (D2D) UE, machine type UE or UE capable of machine to machine (M2M) communication, PDA, tablet computer, mobile terminals, smart phone, laptop embedded equipped (LEE), laptop mounted equipment (LME), USB dongles, ProSe UE, V2V UE, V2X UE, MTC UE, eMTC UE, FeMTC UE, UE Cat 0, UE Cat M1, narrowband Internet of Things (NB-IoT) UE, UE Cat NB1, etc.

In some embodiments a more general term "network node" is used and it can correspond to any type of radio access node or any network node, which communicates with a UE and/or with another network node. Examples of network nodes are NodeB, MeNB, SeNB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, SON, positioning node (e.g. E-SMLC), MDT, test equipment, etc. Moreover, where the following description refers to steps taken in or by a network node or a radio access node, this also includes the possibility that some or all of the processing and/or decision making steps may be performed in a device that is physically separate from the radio antenna of the node, but is logically connected thereto. Thus, where processing and/or decision making is carried out "in the cloud", the relevant processing device is considered to be part of the node for these purposes.

The embodiments are described for LTE or LTE based systems such as machine-type communication (MTC), evolved MTC (eMTC), NB-IoT etc. As an example MTC UE, eMTC UE and NB-IoT UE also called UE category 0, UE category M1 and UE category NB1. However, the embodiments are applicable to any RAT or multi-RAT systems, where the UE receives and/or transmit signals (e.g. data) e.g. LTE FDD/TDD, WCDMA/HSPA, GSM/GERAN, Wi-Fi, WLAN, CDMA2000, 5G, NR, etc. It is recalled that 5G, the fifth generation of mobile telecommunications and wireless technology is not yet fully defined but in an advanced draft stage within 3GPP. It includes work on 5G New Radio (NR) Access Technology. LTE terminology is used in this disclosure in a forward looking sense, to include equivalent 5G entities or functionalities although a different term is specified in 5G. A general description of the agreements on 5G New Radio (NR) Access Technology so far is contained in most recent versions of the 3GPP 38-series Technical Reports.

FIG. 1A shows a flowchart illustrating a method in accordance with the present disclosure. The method provides for the control of channel quality monitoring in a wireless communication system that utilises beamforming. The acronym CQI is used to refer to a channel quality indicator, that is, information indicating the quality of a communication link between equipment in a communication network. In the context of the present disclosure, the communication link is a wireless communication link, and examples of equipment include a base station and a user equipment. Although in LTE the acronym "CQI" (Channel Quality Indicator) has a specific definition, in the present disclosure the term is used in a broader sense. In other words, what is meant by CQI here could mean any kind of channel quality indicator that can be distinguished for different sub-bands such as Reference Signal Received Power (RSRP), Reference Signal Received Quality (RSRQ), Signal-to-Interface-plus-Noise Ratio (SINR), CQI (as defined in LTE), Precoding Matrix Indicator (PMI), Rank Indicator (RI), and so on. In the context of the invention the term beam should also be interpreted in a broad sense although most of the time it is referred as a reference signal that is beamformed with different downlink beam configuration by the network. Examples include Channel State Information Reference Signal (CSI-RS) resources in frequency and time domains and Synchronisation Signal (SS/PBCH) block(s), also referred to as SSBs.

FIG. 1B shows a wireless communication system 10 in accordance with an aspect of an embodiment, wherein the wireless communication system 10 is configured to utilise beamforming. The wireless communication system 10 comprises at least one base station and at least one user equipment, and may comprise other components such as a relay node, central controller, and so on. All of the steps shown in the FIG. 1A method (that is, steps S101, S102 and S103) may be performed by a base station 100, by a user equipment 110, or by another part of a wireless communication system 10, such as a central controller (not shown). The wireless communication system 10 in the aspect of an embodiment shown in FIG. 1B includes a base station 100 that is configured to perform the steps shown in the FIG. 1A method, and also a user equipment 110 that is configured to perform the steps shown in the FIG. 1A method. The base station 100 is configured to communicate with a further user equipment 2110 that is not configured to perform the steps shown in the FIG. 1A method, and the user equipment 110 is configured to communicate with a further base station 2100 that is not configured to perform the steps shown in the FIG. 1A method.

A plurality of signals are transmitted from a base station to a user equipment. The signals may be reference signals intended primarily for use in the monitoring of the quality of the channels, or may be data signals used for user data transmission between the base station and user equipment. In the beamforming system, the signals between the base station and user equipment are transmitted using different frequency sub-bands and different spatial beams. As will be appreciated, different signals can be transmitted using the same frequency sub-band using a variety of different beams, and equally different signals can be transmitted using the same beam in combination with different frequency sub-bands. A combination of a given frequency sub-band and given spatial beam is referred to herein as a frequency sub-band and beam pairing, or as a pairing.

The qualities of the received signals (for example, CQIs as discussed above) are measured at the user equipment for each of the frequency sub-band and beam pairings used to transmit a signal. The measured qualities are then used as shown in step S101 of the method of FIG. 1A.

In step S101 the measured qualities for the frequency sub-band and beam pairings are analysed. The purpose of this analysis is to allow the identification of plural frequency sub-band and beam pairings for which the measured qualities are correlated, that is, where the measured qualities of the pairings share a common characteristic or attribute. In an example, where two pairings were found to have measured qualities which increased/decreased in tandem with one another over a number of measurement periods, these pairings may be identified as correlated. In a further example, where two pairings have substantially the same measured quality (or measured qualities that are within a given range of one another), these pairings may be identified as correlated. The correlation or non-correlation between pairings may be based on a single measurement of each pairing, although in some aspects of embodiments a plurality of measurements for each pairing over plural measurement periods are used to identify correlation. The exact criteria according to which two pairings are identified as correlated are determined by the specific requirements of the given wireless communication system. Further examples of correlation conditions are discussed in greater detail below.

Following the identification of plural frequency sub-band and beam pairings that are correlated with one another, the periodicity of the received signal quality analysis process for each of the plural frequency sub-band and beam pairings is evaluated (see step S102). The periodicity of the received signal quality analysis process is a measure of how often this process is performed. The periodicity may be measured in measurement periods, seconds, or any other suitable unit of time. The received signal quality analysis process may extend over plural measuring periods; where this is the case references to the measuring period in which the analysis process is performed should be understood as references to the measuring period in which the analysis process starts to be performed.

The received signal quality analysis process for a given frequency sub-band and beam pairing may comprise steps of: transmitting one or more signals (in one or more measuring periods) from a base station to a user equipment using the frequency sub-band and beam pairing, and receiving the signals at a user equipment; measuring the quality of the received signals at the user equipment; and sending the received signal quality measurements to the base station. How often each of the steps is performed in a received signal quality analysis process may vary between wireless communication systems. For example, a received signal quality analysis process in an aspect of an embodiment may comprise: transmitting one or more signals from base station to user equipment; measuring the quality of the received signals; and sending the received signal quality measurements to the base station, all in a single measuring period. Alternatively, a received signal quality analysis process in an aspect of an embodiment may comprise: transmitting one or more signals from base station to user equipment; and measuring the quality of the received signals, in multiple (potentially consecutive) measuring periods, caching the quality measurement results in the user equipment, and then sending the quality measurement results (or a report of the results) in a subsequent measuring period. As will be appreciated, the exact details of the received signal quality analysis process are determined by the specific requirements of a given wireless communication system.

The evaluation of the periodicity of the received signal quality analysis process may comprise analysing how often the received signal quality analysis process is performed for each of the pairings, comparing the periodicities for the pairings for which the received signal quality is correlated, and so on. When the evaluation has been performed, it is determined whether or not to adjust the periodicity of the analysis process for each of the pairings for which the received signal quality is correlated (see step S103).

The adjustment of the periodicity for a given pairing may comprise either increasing or reducing the periodicity of the process for, or even stopping the process for, a given pairing. Where the periodicity is measured in terms of measurement periods, increasing the periodicity comprises reducing the time interval between measuring periods including the received signal quality analysis process for that pairing (or, where the received signal quality analysis process takes place over plural measuring periods, reducing the time interval between measuring periods including the start of the received signal quality analysis process). Conversely, where the periodicity is measured in terms of measurement periods, reducing the periodicity comprises increasing the time interval between measuring periods including the received signal quality analysis process (or, where the received signal quality analysis process takes place over plural measuring periods, increasing the time interval between measuring periods including the start of the received signal quality analysis process). In a limit case, the "reducing the periodicity" can include stopping the received signal quality analysis process for a given pairing. When it is determined not to adjust the periodicity of the received signal quality analysis process for a given pairing, the current periodicity is retained for that pairing.

The adjustment of the periodicity may also comprise separately adjusting how often steps of the received signal quality analysis process for a given pairing are performed. That is, and with reference to the discussion above, steps such as: transmitting one or more signals (in one or more measuring periods accordingly) from a base station to a user equipment using the frequency sub-band and beam pairing, and receiving the signals at a user equipment; measuring the quality of the received signals at the user equipment; and sending the received signal quality measurements to the base station, may occur more or less often than one another in a given received signal quality analysis process. Therefore, adjusting the periodicity for a given process may comprise (for example) transmitting one or more signals (in one or more measuring periods accordingly) from a base station to a user equipment using the frequency sub-band and beam pairing, and receiving the signals at a user equipment, half as often as before the adjustment in periodicity, but sending the received signal quality measurements to the base station with the same periodicity (that is, not adjusting the periodicity of this specific step, but adjusting the periodicity of other steps of the received signal quality analysis process and therefore adjusting the periodicity of the received signal quality analysis process overall). Again, the specific nature of the adjustments in periodicity is dependent on the requirements of a specific wireless communication system.

In different embodiments, the received signal quality analysis process may comprise different steps. For example, where a user equipment is configured to perform steps S101 to S103, the user equipment may: receive the signals from the base station; measure the quality of the signals; and then perform steps S101 to S103 internally. Alternatively, where a base station is configured to perform steps S101 to S103, the user equipment may: receive the signals from the base station; measure the quality of the signals; and then transmit the measurements to the base station, such that the base station can use the measurements to perform steps S101 to S103. Various alternatives are discussed in greater detail below.

By identifying frequency sub-band and beam pairings for which the received signal quality is correlated and evaluating the periodicity of a received signal quality analysis process for the correlated sub-band and beam pairings, the method can facilitate a reduction in the total number of received signal quality analysis processes required, thereby potentially saving processing time, transmission resources and power in a wireless communication system that utilises beamforming. The number and frequency of the received signal quality analysis processes can be tailored to the specific needs of a given wireless communication system, taking into consideration the capabilities of a base station and user equipment involved.

Figure 2:
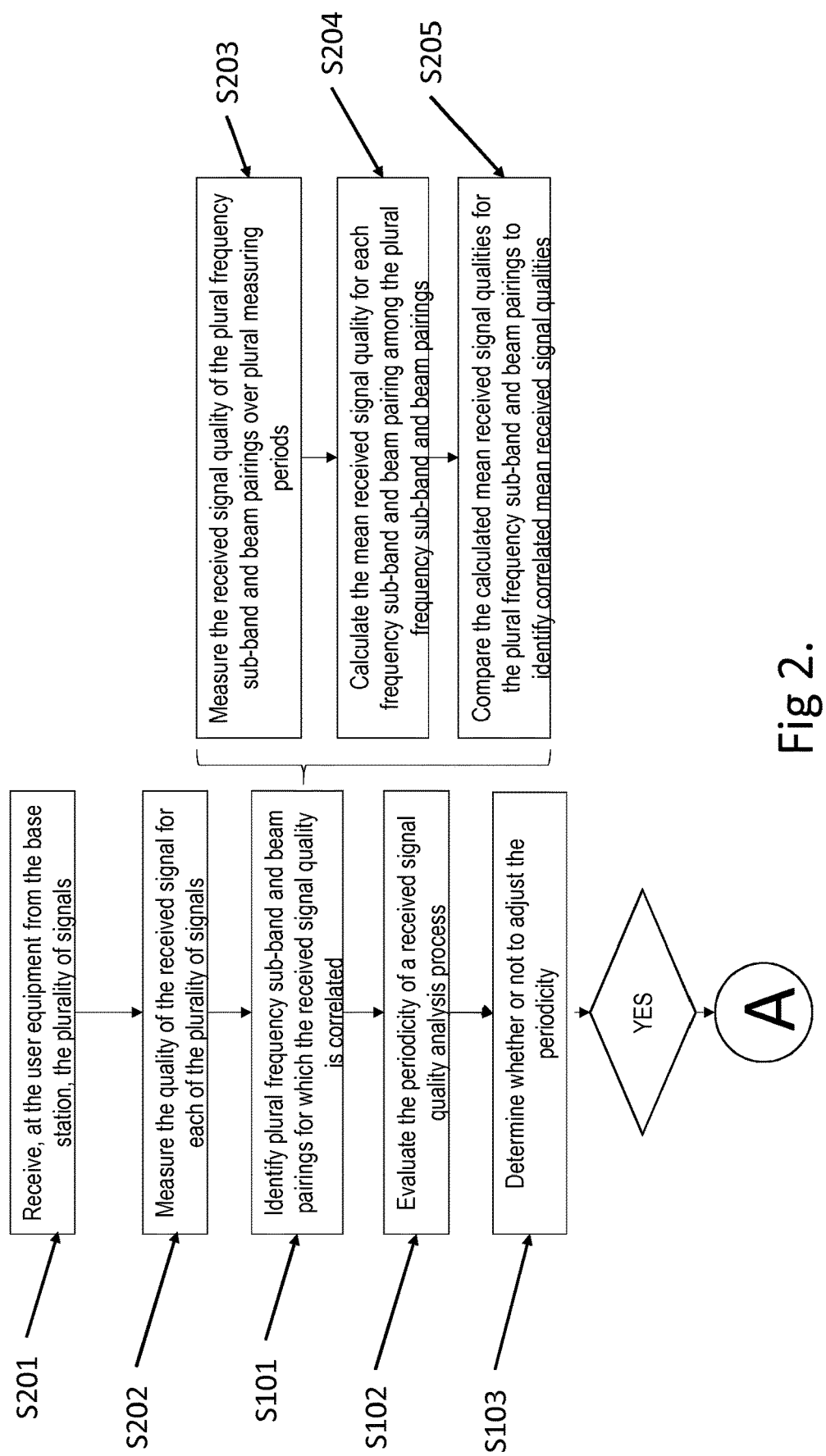
FIG. 2 shows a flowchart illustrating a further method in accordance with an aspect of an embodiment.

FIG. 2 shows a flowchart illustrating a method in accordance with an aspect of an embodiment of the present disclosure. The method illustrated in FIG. 2 is based on the method illustrated in FIG. 1A, but includes optional steps that are not included in the method illustrated in FIG. 1A.

The method shown in FIG. 2 includes steps of: receiving, at the user equipment from the base station, the plurality of signals (step S201); and measuring the quality of the received signal for each of the plurality of signals (step S202). Typically these steps may be performed immediately prior to the step of identifying plural pairings for which the received signal quality is correlated (step S101), to ensure that the identification of pairings having correlated received signal qualities accurately reflects the current state of the communication link. Alternatively, step S101 may be performed using older quality measurements that have been stored. As discussed above, steps S201 and S202 are typically performed by a user equipment, therefore where steps S101 to S103 are performed outside the user equipment (for example, in a base station or elsewhere in the wireless communication network), step S202 may also comprise sending the results of the measurements of the received signal quality to the equipment to be used to perform steps S101 to S103. The method illustrated in FIG. 2 may continue at point "A", as discussed in greater detail below (with reference to FIG. 6).

Figure 3A:
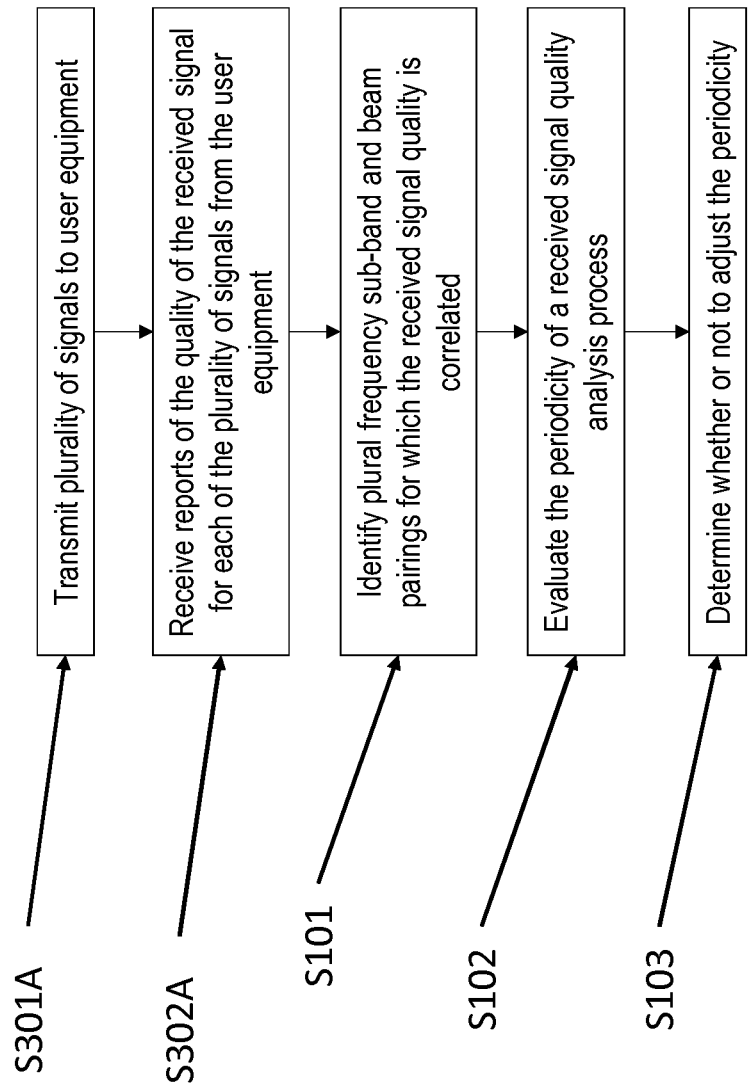

FIG. 3A and FIG. 3B are flowcharts illustrating methods in accordance with aspects of embodiments of the present disclosure. The method illustrated in FIG. 3A is performed by a base station such as the base station 100 shown in FIG. 4, and the method illustrated in FIG. 3B is performed by a user equipment such as the user equipment 110 shown in FIG. 5. Either or both of the base station 100 shown in FIG. 4 and the user equipment 110 shown in FIG. 5 may be included in a wireless communication system such as, for example, the wireless communication system 10 shown in FIG. 1B.

As can be seen in FIG. 3A, the base station may be configured to transmit a plurality of signals to the user equipment (step S301A). As discussed above, the signals may be reference signals intended primarily for use in the monitoring of the quality of the channels, or may be data signals used for general data transmission between the base station and user equipment. The signals may be transmitted on every combination of frequency sub-band and spatial beam, or on a sub-set of the combinations. The signals may be transmitted simultaneously, or over a period of time (for example, a number of measuring periods). All of these options are dependent on the specific configuration of a given wireless communication system.

Figure 4:
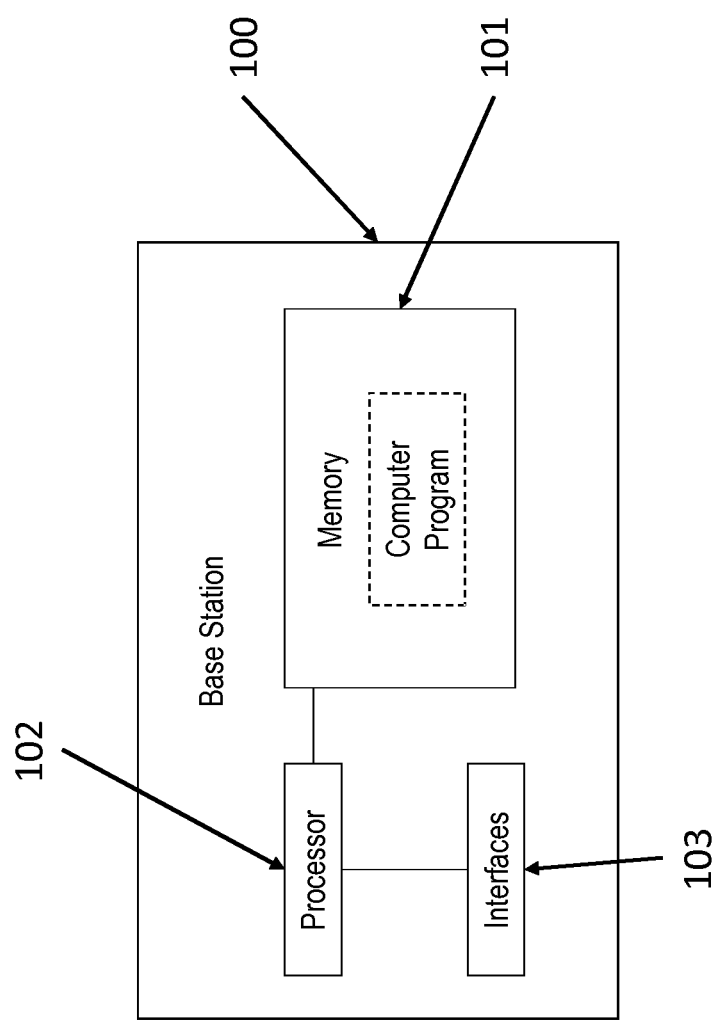
FIG. 4 shows a schematic diagram of a base station in accordance with an aspect of an embodiment.

In the aspect of an embodiment shown in FIG. 3A, following the transmission of the signals, the base station receives reports of the quality of the received signals for each of a plurality of signals from the user equipment (step S302A). In the example illustrated by FIG. 3A the base station is then responsible for performing steps S101, S102 and S103 as illustrated in FIG. 3A (and also FIG. 1A and FIG. 2). The base station used to execute the method of FIG. 3A may be as shown in FIG. 4, or may be another base station. If the base station is as shown in FIG. 4, the base station 100 may execute the steps of the method in accordance with a computer program stored in a memory 101, executed by a processor 102 in conjunction with one or more interfaces 103. The base station 100 may also generally comprise hardware and/or software for transmitting and receiving wireless signals, such as one or more antennas, and transceiver circuitry coupled to the one or more antennas. The base station 100 may also be configured to execute the steps of other aspects of embodiments, as discussed in detail below.

As can be seen in FIG. 3B, the user equipment may be configured to receive a plurality of signals from a base station (step S301B). As discussed above, the signals may be reference signals intended primarily for use in the monitoring of the quality of the channels, or may be data signals used for general data transmission between the base station and user equipment. The signals may be transmitted on every combination of frequency sub-band and spatial beam, or on a sub-set of the combinations. The signals may be transmitted simultaneously, or over a period of time. All of these options are dependent on the specific configuration of a given wireless communication system. The user equipment may then be further configured to measure the quality of the received signal for each of the plurality of signals. Based on the measured qualities of the received signals, the user equipment illustrated in FIG. 3B may then perform steps S101, S102 and S103 as illustrated in FIG. 3B (and also FIG. 1A and FIG. 2). Once these steps have been executed, the user equipment may send (transmit) to the base station the plural frequency sub-band and beam pairings for which the received signal quality is correlated, and the results of the determination as to whether or not to adjust the periodicity (step S302B).

Figure 5:
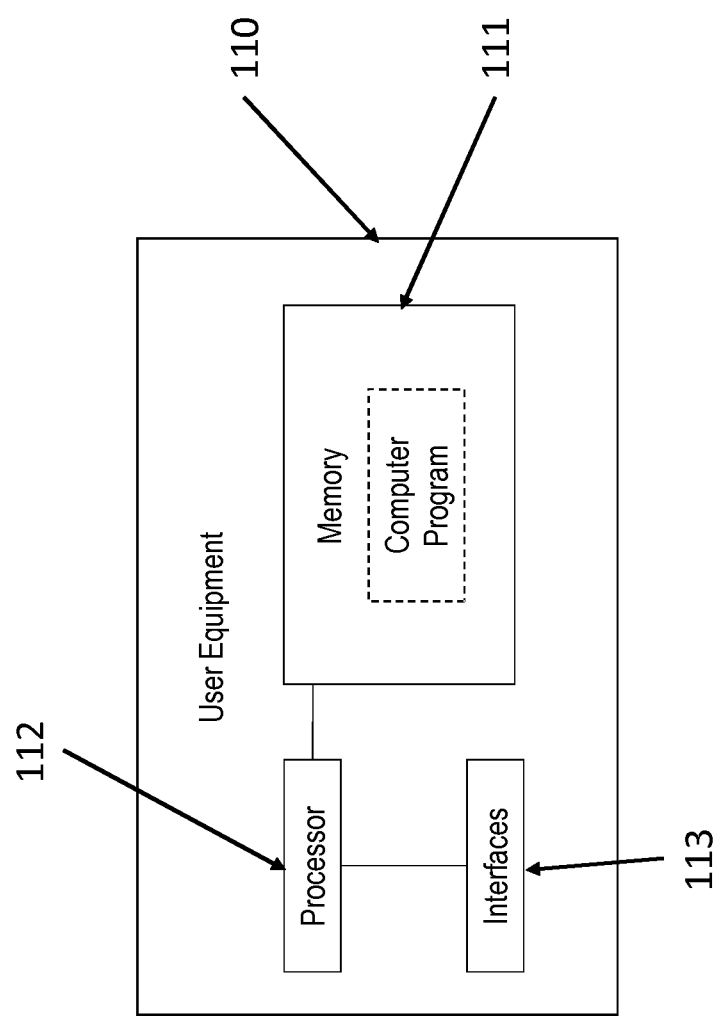
FIG. 5 shows a schematic diagram of a user equipment in accordance with an aspect of an embodiment.

The user equipment used to execute the method of FIG. 3B may be as shown in FIG. 5, or may be another user equipment. If the user equipment is as shown in FIG. 5, the user equipment 110 may execute the steps of the method in accordance with a computer program stored in a memory 111, executed by a processor 112 in conjunction with one or more interfaces 113. The user equipment 110 may also generally comprise hardware and/or software for transmitting and receiving wireless signals, such as one or more antennas, and transceiver circuitry coupled to the one or more antennas. The user equipment 110 may also be configured to execute the steps of other aspects of embodiments, as discussed in detail below.

In an aspect of an embodiment of the present disclosure, the step of identifying the pairings for which the received signal quality is correlated (step S101) may comprise measuring the received signal quality of the plural frequency sub-band and beam pairings over plural measuring periods (step S203). Although correlation identification can be made based on the results of measurements taken in a single measuring period, it is possible that this may result in pairings which are fluctuating and not actually correlated being mistakenly identified as correlated. As such, more accurate identification of correlated pairings may be provided by basing the identification on measurements taken over plural measuring periods. The number of measurements used (per pairing) for the correlation identification can be altered depending on the specific needs of the wireless communication system; an example system may use 6 measurements per pairing to identify correlation.

Where the received signal quality of the plural frequency sub-band and beam pairings has been measured over plural periods, the method may further comprise calculating a mean received signal quality for each of the plural frequency sub-band and beam pairings, using the results obtained in the plural measuring periods (step S204). Once calculated, the mean received signal qualities for the plural frequency sub-band and beam pairings can be compared to identify correlated mean received signal qualities (step S205). In this way, the influence of any atypical measurements is reduced, and the correlation identification is more likely to accurately reflect any relationship between the pairings.

If the mean received signal qualities for the plural frequency sub-band and beam pairings are compared to identify correlated mean received signal qualities, the mean signal received qualities may be identified as correlated if the mean received signal qualities are within a given standard deviation value of each other, for example, if the mean received signal qualities are within 1 standard deviation of each other. The standard deviation used to assess correlation can be determined depending upon the requirements of the wireless communication system; lower values (such as 0.5 standard deviations) would require the mean received signal qualities of the pairings to be more closely correlated and would thereby produce more accurate results, however lower values would also result in smaller numbers of mean received signal qualities satisfying the criteria for correlation, therefore smaller groups of plural pairings and more measurements being required. The reverse is true of higher standard deviation values.

Figure 6:
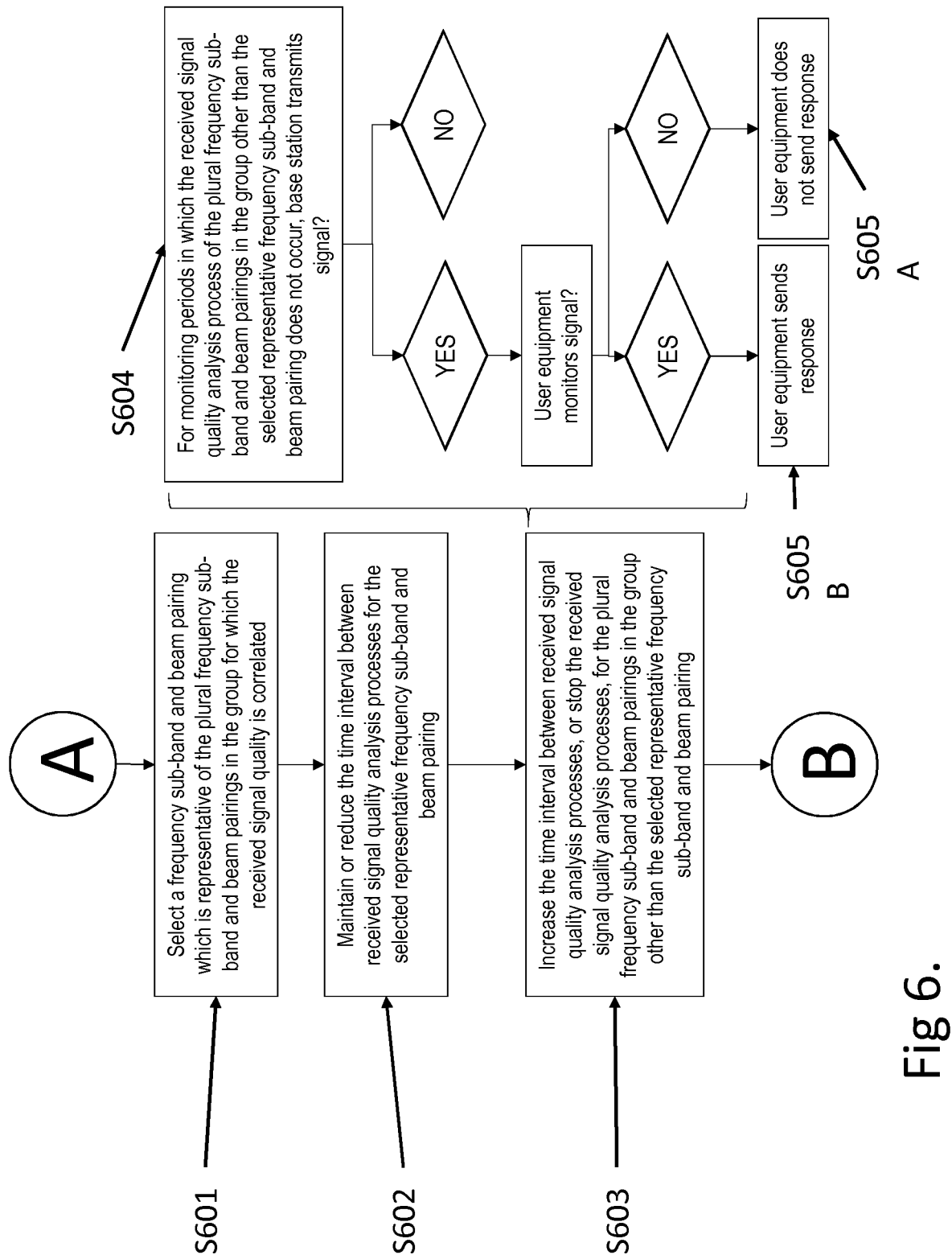
FIG. 6 shows a flowchart illustrating a further method in accordance with an aspect of an embodiment.

When it is determined to adjust the periodicity of the received signal quality analysis process for one or more of the plural frequency sub-band and beam pairings (YES in step S103 as shown in FIG. 2), a method in accordance with an aspect of an embodiment may comprise further steps as illustrated in FIG. 6 (as indicated by marker "A" in FIG. 2 and FIG. 6). In particular, the method may comprise the step of selecting a frequency sub-band and beam pairing that is representative of the plural frequency sub-band and beam pairings in the group for which the received signal quality is correlated (step S601).

The determination of which of the plural frequency sub-band and beam pairings in the group for which the received signal quality is correlated is representative of the group may be made based on the specific configuration of a given wireless communication system. In some wireless communication systems, examples of how a representative pairing may be selected include selection of the frequency sub-band and beam pairing having the lowest frequency among the plural frequency sub-band and beam pairings in the group (that is, pairing for which the midpoint frequency of the frequency range defined by the sub-band is the lowest), or certain frequency sub-band and beam pairings may be predefined as being representative in the network configuration, and may be used as representative pairings for any group of which they are part. Alternatively, the pairings within a group may be analysed in order to select the representative pairing; examples of this approach include selection of the frequency sub-band and beam pairing having the median measured received signal quality among the plural frequency sub-band and beam pairings in the group, or the frequency sub-band and beam pairing having a measured received signal quality closest to the mean received signal quality among the plural frequency sub-band and beam pairings in the group. There are benefits to either approach; selection based on predefined criteria (for example, lowest midpoint frequency or predefined pairings) requires fewer calculations to be performed and may be faster, and selection based on median measured received signal quality or measured received signal quality closest to the mean received signal quality among the plural frequency sub-band and beam pairings in the group may result in the selection of a pairing that more accurately indicates the behaviour of the plural pairings in the group. The standard deviation value to be used to assess correlation may be configured or pre-configured in a base station or user equipment (typically the case if one of these pieces of equipment is responsible for identifying mean received signal qualities). In particular, the standard deviation value may be hard coded into the base station or user equipment, or configured by an external configuration interface. The base station or user equipment may include an algorithm to determine a suitable standard deviation value based on, for example, predicted interference, base station or user equipment properties (such as remaining battery power) and so on.

Figure 7:
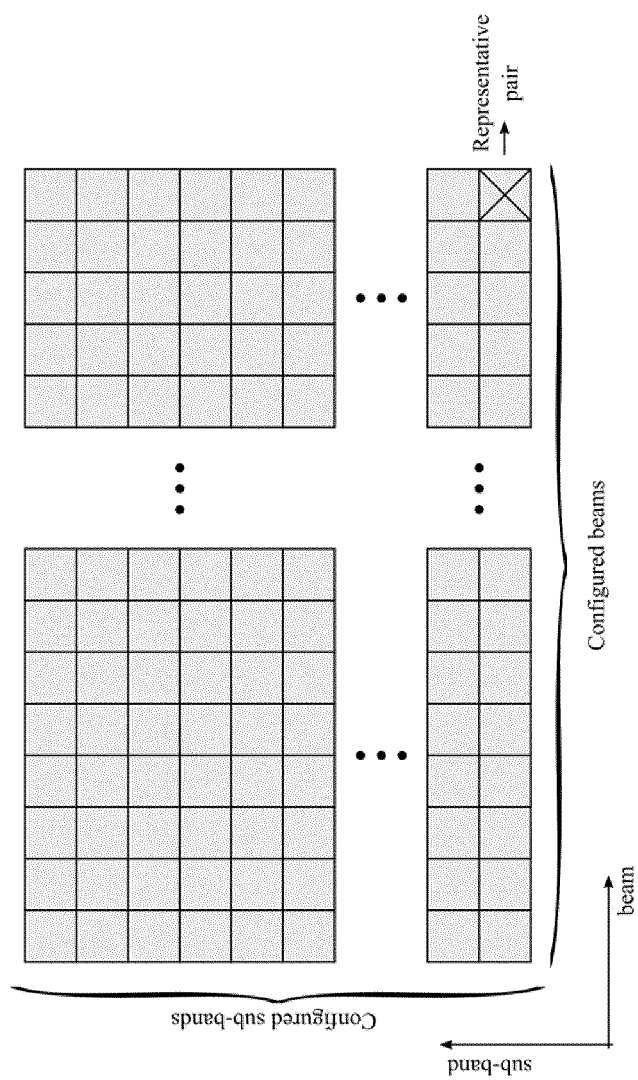
FIG. 7 shows a plot of example frequency sub-band and spatial beam pairings.

FIG. 7 shows a plot of example frequency sub-band and spatial beam pairings, for example, the pairings which may be received by a UE. As indicated by the axes labels on the plot, the x axis indicates the variation in spatial beam, and the y axis indicates variation in frequency sub-band. Each square on the plot indicates a frequency sub-band and spatial beam pairing.

All of the frequency sub-band and spatial beam pairings shown in FIG. 7 have received signal qualities that are correlated, that is, the measured received signal qualities for all of the pairings satisfy the correlation condition used in the wireless communication system to which FIG. 7 relates. As a result, a single representative pairing may be used to represent the plural frequency sub-band and beam pairings in the group for which the received signal quality is correlated. The representative pairing is indicated in FIG. 7 using an "X".

Figure 8:
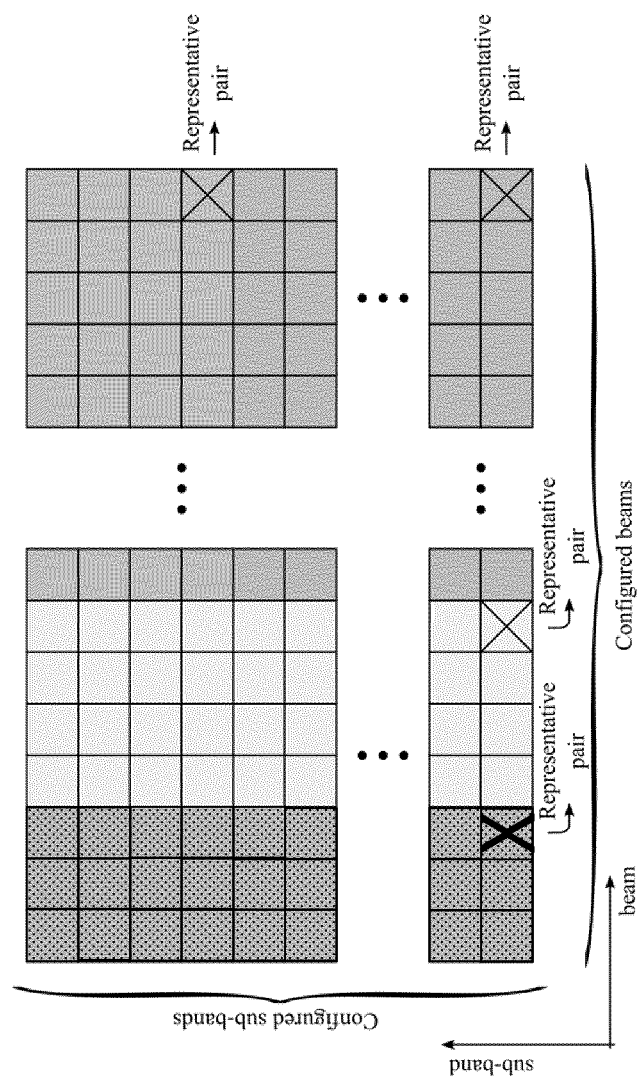
FIG. 8 shows a further plot of example frequency sub-band and spatial beam pairings.

An alternative plot of example frequency sub-band and spatial beam pairings is shown in FIG. 8. In the situation illustrated by FIG. 8, analysis of the received signal qualities for the frequency sub-band and spatial beam pairings has resulted in four groups of pairings for which the received signal qualities are correlated being identified. Each group of pairings in FIG. 8 is indicated using a different shading pattern. As is the case in FIG. 7, a single representative pairing may be used to represent the plural frequency sub-band and beam pairings in each group for which the received signal quality is correlated. The representative pairings are indicated in FIG. 8 using "X". The pairings for which the received signal qualities are correlated in the example illustrated in FIG. 8 are located in blocks of successive spatial beams and frequency sub-bands. This is because pairings having similar frequency sub-bands and/or spatial beams are more likely to have correlated received signal qualities (the influence of interference generating factors is likely to be similar on beams having similar parameters). However, this is not necessarily the case, and it is possible for pairings having correlated received signal qualities to be dispersed across the spatial/frequency space at random.

Figure 9:
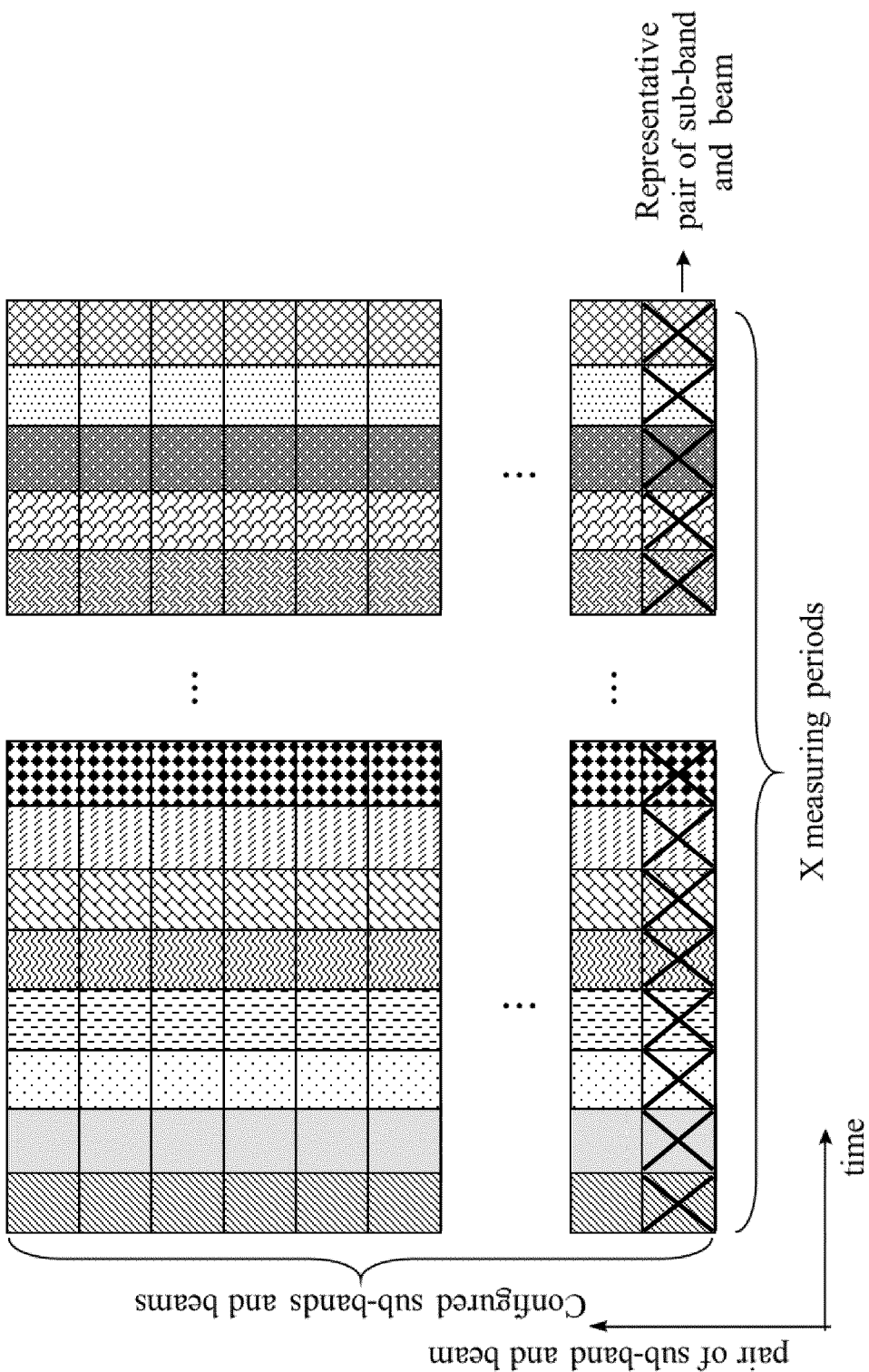
FIG. 9 shows a plot of the variation in received signal quality for plural frequency sub-band and beam pairings with time.

FIG. 9 is a plot showing the variation in the received signal quality for the plural frequency sub-band and beam pairings with time. FIG. 9 illustrates this variation by indicating the variation in the pairings forming a single group (having received signal qualities that are correlated) over time, where the time is considered in units of measuring periods. For simplicity, an aspect of an embodiment wherein the received signal quality analysis process takes place in a single measuring period is shown in the Figure. The x axis of the Figure indicates the variation in measuring period (that is, time) and the y axis indicates the different pairings within the group, with the representative pairing for the group indicated by an "X". The received signal quality for the pairings in FIG. 9 varies with time, as indicated by the different shading used in the plot (different shading patterns being used to represent different received signal qualities), but in each measuring period the received signal qualities within the group remain correlated.

Referring again to FIG. 6, following the selection of a representative pairing, the method may further comprise a step of maintaining or reducing the time interval between measuring periods including received signal quality analysis processes for the selected representative frequency sub-band and beam pairing (see FIG. 6, step S602). For example, if the received signal quality analysis processes for the representative pairing previously took place in every fourth measuring period, this time interval may be reduced to every second measuring period (where measuring periods are not used, an equivalent reduction in the appropriate time measurement unit would be applied). Alternatively, if it is determined that the received signal quality analysis processes for the representative pairing is already performed at an acceptable time interval, this time interval may be maintained. It is possible that the time interval between received signal quality analysis processes for the representative pairing may be increased in rare situations where it is desired to drastically reduce the number of analysis processes performed, although it is envisaged that this operation is rarely performed. Further, and particularly (although not exclusively) in situations where substantial fluctuation in the received signal quality is expected due to, for example, an adverse signal propagation environment, the time interval may be reduced such that the received signal quality analysis process of the representative frequency sub-band and beam pairing occurs in each measuring period (or at least, more often).

In addition to, or alternatively to, reducing the time interval between measuring periods including received signal quality analysis processes for the selected representative frequency sub-band and beam pairing, aspects of embodiments further comprise increasing the time interval between measuring periods including received signal quality analysis processes for the plural frequency sub-band and beam pairings in the group other than the selected representative frequency sub-band and beam pairing, or stopping the received signal quality analysis processes for the plural frequency sub-band and beam pairings in the group other than the selected representative frequency sub-band and beam pairing (step S603). In this way, the number of received signal quality analysis processes required as a whole is reduced, and accordingly resource usage (battery power, transmission time, processor usage, etc.) is reduced.

One way to reduce resource usage is to stop received signal quality analysis processes for the plural frequency sub-band and beam pairings in the group other than the selected representative frequency sub-band and beam pairing, although this may also result in a delay in detecting when one of the plural frequency sub-band and beam pairings in the group other than the selected representative frequency sub-band and beam pairing ceases to correlate with the representative pairing, leading to incorrect estimation of the pairing response. Alternatively, in some aspects of embodiments, the received signal quality analysis process of the plural frequency sub-band and beam pairings in the group other than the selected representative frequency sub-band and beam pairing is implemented at a predetermined ratio of measuring periods relative to the analysis process of the representative frequency sub-band and beam pairing. In this way, subsequent adjustments to the frequency of the received signal quality analysis process for the representative pairing are mirrored for the other pairings, leading to simple configuration adjustments. An example of a typical predetermined ratio is one received signal quality analysis process for the other pairings for every fourth received signal quality analysis process for the representative pairing.

In some aspects of embodiments, when the received signal quality analysis process is not performed (or started/ongoing, where the process occurs over plural measuring periods) in every measuring period (for either the plural frequency sub-band and beam pairings in the group other than the selected representative frequency sub-band and beam pairing alone, or both the plural frequency sub-band and beam pairings in the group other than the selected representative frequency sub-band and beam pairing and the selected representative frequency sub-band and beam pairing), the wireless communication system may be configured to perform one of a variety actions, as discussed below.

Where it is determined that the signal analysis process is not to be performed in a given measuring period for a given frequency sub-band and beam pairing (either a representative pairing or another pairing), aspects of embodiments allow various actions to be performed. A base station that has knowledge of the measuring periods in which the signal analysis process is, and is not, to be performed for a given pairing (either because the base station is responsible for adjusting the periodicity of the received signal quality analysis process or because the base station has been informed by a further device, such as a UE, of the adjusted periodicity) may be configured to simply not send a signal using the given pairing (see FIG. 6, step S604 NO) when the received signal quality analysis process is not to take place. In this way, the base station is not required to send a signal in the measuring period using the given pairing, and the UE is not required to monitor for a signal the measuring period using the given pairing, or analyse a signal. In this way, transmission and processor resources are saved and, particularly in the case of the UE which is likely to operate using a battery power source, power reserve usage is also reduced.

In situations where the base station does send a signal in a given measuring period for a given frequency sub-band and beam pairing for which the received signal quality analysis process is not to be performed (FIG. 6, step S604 YES), the UE may not monitor (that is, ignore) the signal (step S605A), and therefore not send a response to the signal. This may occur where the base station does not have knowledge of the measuring periods in which the signal reporting process is, and is not, to be performed for a given pairing, and may also occur where the base station does have knowledge but does not modify a transmission schedule. Where the BS transmits a signal that is not monitored by the UE, the BS processing and transmission resources are used, but the UE processing, transmission and power resources may be conserved. Alternatively, where the base station does send a signal in a given measuring period for a given frequency sub-band and beam pairing for which the received signal quality analysis process is not to be performed (FIG. 6, step S604 YES), the UE may monitor the signal and send a response (step S605B). The response signal may be a simple acknowledgement that the signal has been received and depending on the wireless communication system configuration, may also be used to indicate that a given pairing is part of a group of pairings which use a particular representative pairing for received signal quality monitoring. In particular, the response signal may be a single bit. Sending a response requires the UE to receive the signal, however it is not necessary for the UE to perform any analysis of the signal, and therefore the UE resources may be conserved relative to situations in which the UE performs an analysis of the received signal quality.

Figure 10:
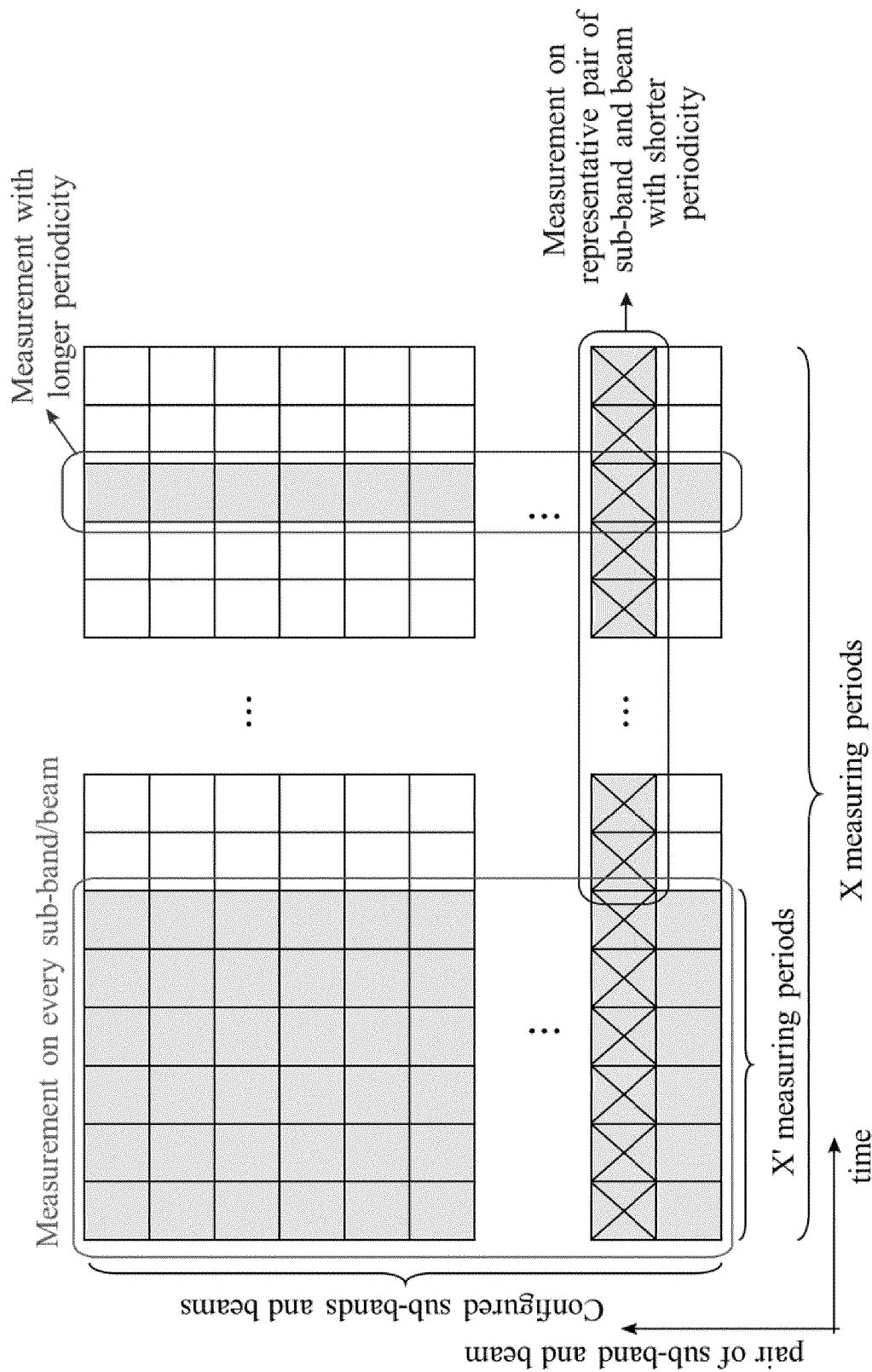
FIG. 10 shows a plot of the variation in the measurement periodicity of received signal quality for plural frequency sub-band and beam pairings with time.

FIG. 10 is a plot showing the variation in the measurement periodicity of the received signal quality for the plural frequency sub-band and beam pairings with time. In FIG. 10 time is considered in units of measuring periods. The x axis of FIG. 10 indicates the variation in measuring period (that is, time) and the y axis indicates the different pairings within the group, with the representative pairing for the group indicated by an "X". As indicated by FIG. 10, aspects of embodiments may include an initial period comprising plural measuring periods during which the received signal quality is measured for all of the frequency sub-band and beam pairings. Pairings for which the received signal quality is measured are indicated by shading in FIG. 10. The measurement of the received signal quality for all the pairings may be used, for example, to establish a mean received signal quality for each of the plural frequency sub-band and beam pairings, using the results obtained in the plural measuring periods, as discussed above with reference to the flowchart of FIG. 2.

In the example illustrated by FIG. 10, the initial period comprises 6 measuring periods, but the number of measurements used (per pairing) for the correlation identification can be altered depending on the specific needs of the wireless communication system. In FIG. 10, the representative pairing is indicated in the initial period; this is for illustrative purposes only as the representative pairing would not have been identified until after the plural frequency sub-band and beam pairings having correlated received signal qualities were identified following the initial period.

Once the representative pairing for the group of channels having correlated received signal qualities has been identified, the periodicity of the received signal quality analysis process for the pairings is adjusted as discussed above in the context of FIG. 6. In the example shown in FIG. 10, for the representative pairing, the periodicity of the received signal quality analysis process is maintained such that the process is performed in every measuring period. By contrast, for the plurality of pairings in the group other than the representative pairing, the periodicity of the received signal quality analysis process is adjusted such that the time interval between measuring periods including received signal quality analysis processes for the plural frequency sub-band and beam pairings in the group other than the selected representative frequency sub-band and beam pairing is increased. In the example shown in FIG. 10, the received signal quality analysis process is performed for every pairing (that is, not just the representative pairing) in every tenth measuring period. As discussed above, this provides a means for checking that the received signal qualities of the pairings remain correlated.

Once the time intervals between the received signal quality analysis processes for the pairings have been adjusted or not adjusted in accordance with steps S602 and S603, the system may then maintain the adjusted time intervals indefinitely, or until deactivation, or until another condition is satisfied. Examples of conditions which can result in further adjustments are discussed below, with reference to the flow chart in FIG. 11.

Figure 11:
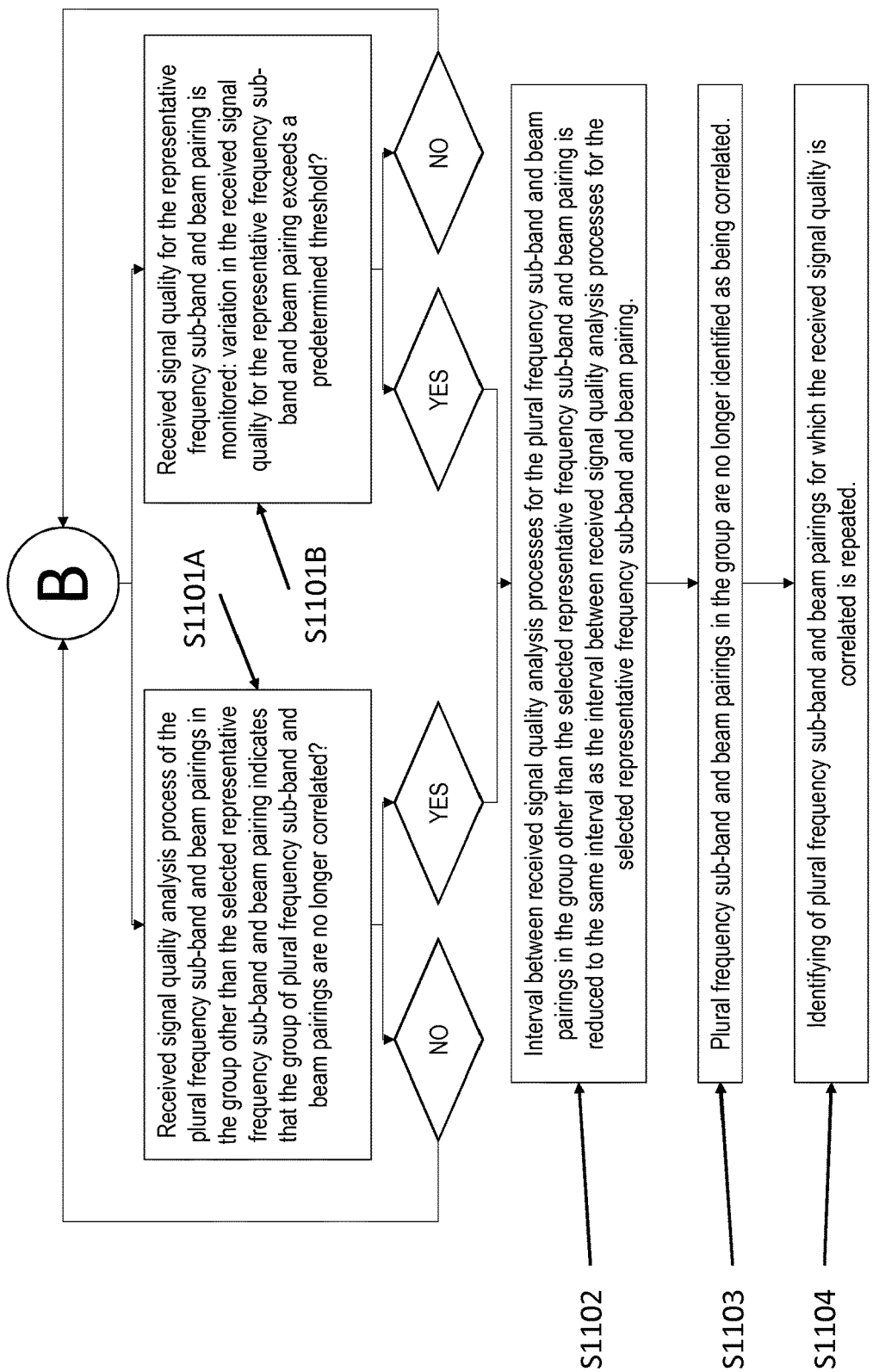
FIG. 11 shows a flowchart illustrating a further method in accordance with an aspect of an embodiment.

FIG. 11 is a flow chart illustrating aspects of the invention wherein the grouping of the pairings by correlated received signal quality may be ungrouped. In aspects of embodiments the received signal quality analysis process may be performed (at a longer time interval) for all of the plural frequency sub-band and beam pairings in the group, rather than only the representative paring for which the received signal quality analysis process is performed at a shorter time interval. In aspects of embodiments, if the received signal quality analysis process is performed for the plural frequency sub-band and beam pairings in the group, and indicates that the group of plural frequency sub-band and beam pairings are no longer correlated (see FIG. 11, step S1101A, YES), then it may be determined that monitoring the representative pairing alone is not sufficient to establish the received signal quality for all of the pairings in the group. By contrast, if the received signal quality analysis process indicates that the pairings remain correlated (Step S1101A, NO), then the reporting processes may continue using the established periodicity.

If it is determined that monitoring the representative pairing alone is not sufficient to establish the received signal quality for all of the pairings in the group, then the interval between received signal quality analysis processes of the plural frequency sub-band and beam pairings in the group other than the selected representative frequency sub-band and beam pairing may be reduced to the same interval as the interval between received signal quality analysis processes for the selected representative frequency sub-band and beam pairing (step 1102); the plural frequency sub-band and beam pairings in the group may be no longer identified as being correlated (step S1103); and the process of identifying plural frequency sub-band and beam pairings for which the received signal quality is correlated may be repeated (step S1104). In this way, the wireless communication system may be returned to a state in which representative pairings are not established, and new groupings of pairings for which the received signal quality is correlated may be established (this may allow new representative pairings to be determined if desired).

Figure 12:
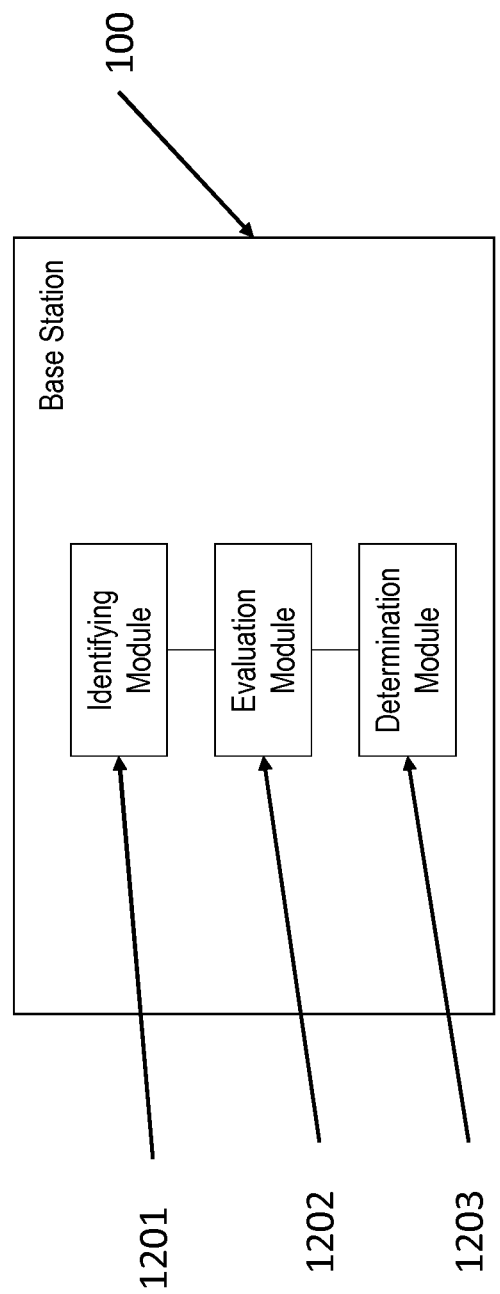
FIG. 12 is a schematic diagram of a base station according to an aspect of an embodiment.

In aspects of embodiments the received signal quality for the representative frequency sub-band and beam pairing may be monitored, and if the variation in the received signal quality for the representative frequency sub-band and beam pairing exceeds a predetermined threshold, the process of steps S1102 to S1104 may also be performed. That is, the groups of pairings for which the received signal quality is correlated may be ungrouped if the measured received signal quality is sufficiently unstable to exceed a predetermined threshold. It may be useful to ungroup the pairings when the measured received signal quality is unstable, as this can be indicative of factors in the transmission environment (such as interference caused by precipitation) that may make it more likely that the received signal qualities for the pairings in the groups are no longer correlated with one another. As discussed above, the wireless communication system may be returned to a state in which representative pairings are not established, and new groupings of pairings for which the received signal quality is correlated may be established (this may allow new representative pairings to be determined if desired). Alternatively, if measurements of the pairings indicate that the received signal qualities of the pairings are not reliably correlated, then frequent monitoring of all pairings may be maintained. FIG. 12 is a schematic diagram of a base station 100 according to further embodiments of the disclosure. The base station 100 may be suitable for performing the methods described above.

The base station 100 comprises an identifying module 1201, an evaluation module 1202 and a determination module 1203. The base station 100 is configured to transmit a plurality of signals utilising different frequency sub-band and beam pairings. The identifying module 1201 is configured to identify plural frequency sub-band and beam pairings for which the received signal quality (at a user equipment) is correlated, based on measurements taken by the user equipment. The evaluation module 1202 is configured, for each frequency sub-band and beam pairing within a group of plural frequency sub-band and beam pairings for which the received signal quality is correlated, to evaluate the periodicity of a received signal quality analysis process. The determination module 1203 is configured to determine whether or not to adjust the periodicity, based on the evaluation performed by the evaluation module 1202.

Figure 13:
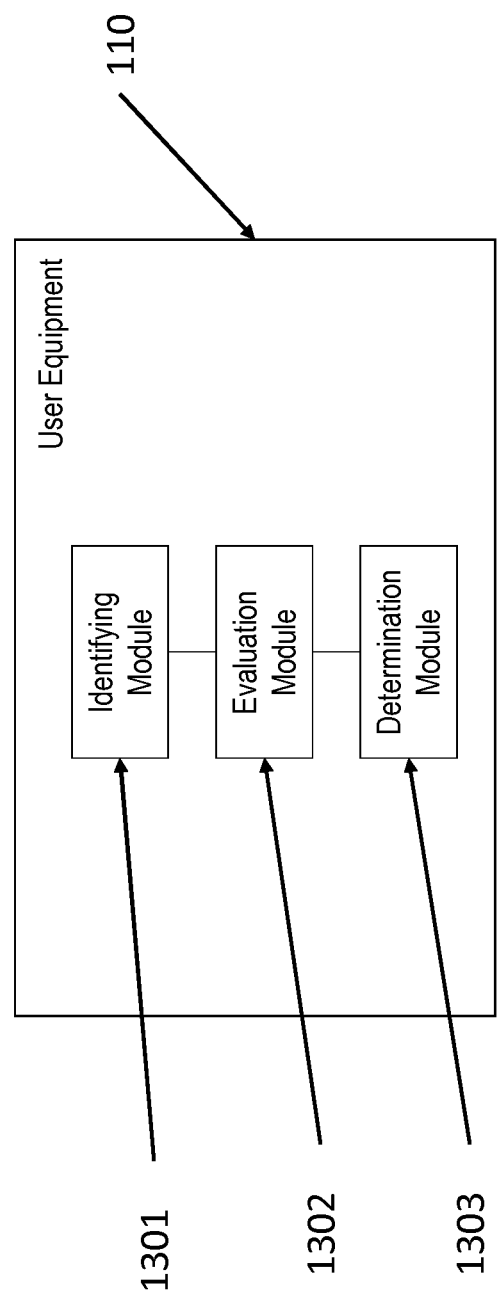
FIG. 13 is a schematic diagram of a user equipment according to an aspect of an embodiment.

The base station 100 may also generally comprise hardware and/or modules for transmitting and receiving wireless signals, such as one or more antennas, transceiver modules coupled to the one or more antennas, and interfaces. FIG. 13 is a schematic diagram of a user equipment 110 according to further embodiments of the disclosure. The user equipment 110 may be suitable for performing the methods described above.

The user equipment 110 comprises an identifying module 1301, an evaluation module 1302 and a determination module 1303. The user equipment 110 is configured to receive a plurality of signals utilising different frequency sub-band and beam pairings. The identifying module 1301 is configured to identify plural frequency sub-band and beam pairings for which the received signal quality of the pairings is correlated, based on measurements taken by the user equipment 110. The evaluation module 1302 is configured, for each frequency sub-band and beam pairing within a group of plural frequency sub-band and beam pairings for which the received signal quality is correlated, to evaluate the periodicity of a received signal quality analysis process. The determining module 1303 is configured to determine whether or not to adjust the periodicity, based on the evaluation performed by the evaluation module 1302.

The user equipment 110 may also generally comprise hardware and/or modules for transmitting and receiving wireless signals, such as one or more antennas, transceiver modules coupled to the one or more antennas, and interfaces.

Either or both of the base station 100 and the user equipment 110 as shown in the schematic diagrams of FIG. 12 and FIG. 13 respectively may be included in a wireless communication system 10. An example of a wireless communication system 10, which may include either or both of the base station 100 and the user equipment 110, is shown in FIG. 1B.

As described above, embodiments of the disclosure provide methods and apparatuses for controlling channel quality monitoring in a wireless communication system that utilises beamforming. In aspects of embodiments, the channel quality monitoring systems may reduce the number of measurements a UE is required to perform, and may also reduce the amount of information being sent. In embodiments of the disclosure, UE battery consumption may be reduced, shorter measurement reports may be provided, and signalling loads and interference may be reduced.

In some embodiments computer program, program product or computer-readable medium comprising instructions which, when executed on a computer, cause the computer to perform any of the examples described herein.

It will be understood that the detailed examples outlined above are merely examples. According to embodiments herein, the steps may be presented in a different order to that described herein. Furthermore, additional steps may be incorporated in the method that are not explicitly recited above.

The invention claimed is:

1. A method for controlling channel quality monitoring in a wireless communication system that utilises beamforming, a plurality of signals being transmitted from a base station to a user equipment and a quality of a received signal being measured by the user equipment for each of the plurality of signals, each of the plurality of signals being transmitted by the base station utilising a frequency sub-band and beam pairing that is different to the frequency sub-band and beam pairings used by the other signals among the plurality of signals, the method comprising:
   identifying plural frequency sub-band and beam pairings for which the received signal quality is correlated;
   for each frequency sub-band and beam pairing within a group of plural frequency sub-band and beam pairings for which the received signal quality is correlated, evaluating periodicity of a received signal quality analysis process, and determining whether or not to adjust the periodicity of the received signal quality analysis process based on a determination of a correlation between the frequency sub-band and beam pairings; and adjusting the periodicity of the received signal quality analysis process, adjusting the periodicity of the received signal quality analysis process comprising:

selecting the frequency sub-band and beam pairing which is representative of the plural frequency sub-band and beam pairings in the group for which the received signal quality is correlated;

one of maintaining and reducing a time interval between measuring periods including received signal quality analysis processes for the selected representative frequency sub-band and beam pairing; and one of:
increasing the time interval between measuring periods including received signal quality analysis processes for the plural frequency sub-band and beam pairings in the group other than the selected representative frequency sub-band and beam pairing; and stopping the received signal quality analysis processes for the plural frequency sub-band and beam pairings in the group other than the selected representative frequency sub-band and beam pairing.

2. The method of claim 1, wherein the method further comprises, prior to identifying the correlated frequency sub-band and beam pairings:

receiving, at the user equipment from the base station, the plurality of signals; and measuring the quality of the received signal for each of the plurality of signals.

3. The method of claim 1, wherein correlated received signal qualities for the plural frequency and sub-band pairings are identified by:

measuring the received signal quality of the plural frequency and sub-band pairings over plural measuring periods;

calculating a mean received signal quality for each frequency and sub-band pairing among the plural frequency and sub-band pairings; and comparing the calculated mean received signal qualities for the plural frequency and sub-band pairings to identify correlated mean received signal qualities.

4. The method of claim 3, wherein received signal qualities for the plural frequency and sub-band pairings are identified as correlated when the mean received signal qualities are within a given standard deviation value of each other.

5. The method of claim 4, wherein the given standard deviation value is one of configured and pre-configured in one of the base station and the user equipment.

6. The method of claim 1, wherein the received signal quality analysis process of the representative frequency sub-band and beam pairing occurs in each measuring period.

7. The method of claim 1, wherein the received signal quality analysis process of the plural frequency sub-band and beam pairings in the group other than the selected representative frequency sub-band and beam pairing is implemented at a predetermined ratio of measuring periods relative to a reporting process of the representative frequency sub-band and beam pairing.

8. The method of claim 1, wherein, in measuring periods in which the received signal quality analysis process of the plural frequency sub-band and beam pairings in the group other than the selected representative frequency sub-band and beam pairing does not occur:

one of:
the base station does not transmit the signal to the user equipment using the frequency sub-band and beam pairings for which the received signal quality analysis process is not to occur; and the base station does transmit the signal to the user equipment using the frequency sub-band and beam pairings for which the received signal quality analysis process is not to occur, and the user equipment one of:
does not monitor the signal; and
monitors the signal and one of sends a response indicating that the pairings remain part of the group and does not send a response.

9. The method of claim 1, wherein, if the received signal quality analysis process is performed for the plural frequency sub-band and beam pairings in the group, and indicates that the group of plural frequency sub-band and beam pairings are no longer correlated:

the interval between received signal quality analysis processes of the plural frequency sub-band and beam pairings in the group other than the selected representative frequency sub-band and beam pairing is reduced to the same interval as the interval between received signal quality analysis processes for the selected representative frequency sub-band and beam pairing;

the plural frequency sub-band and beam pairings in the group are no longer identified as being correlated; and the process of identifying plural frequency sub-band and beam pairings for which the received signal quality is correlated is repeated.

10. The method of claim 1, wherein:
the received signal quality for the representative frequency sub-band and beam pairing is monitored, and if a variation in the received signal quality for the representative frequency sub-band and beam pairing exceeds a predetermined threshold:

the interval between received signal quality analysis processes for the plural frequency sub-band and beam pairings in the group other than the selected representative frequency sub-band and beam pairing is reduced to the same interval as the interval between received signal quality analysis processes for the selected representative frequency sub-band and beam pairing;

the plural frequency sub-band and beam pairings are no longer identified as being correlated; and the process of identifying plural frequency sub-band and beam pairings for which the received signal quality is correlated is repeated.

11. The method of claim 1, wherein the frequency sub-band and beam pairing that is representative of the plural frequency sub-band and beam pairings in the group is selected as one of:

the frequency sub-band and beam pairing having a median measured received signal quality among the plural frequency sub-band and beam pairings in the group;

the frequency sub-band and beam pairing having a measured received signal quality closest to the mean received signal quality among the plural frequency sub-band and beam pairings in the group;

the frequency sub-band and beam pairing having the lowest frequency among the plural frequency sub-band and beam pairings in the group; and the frequency sub-band and beam pairing predefined as being representative in a network configuration.

12. The method of claim 1, wherein the base station:
transmits the plurality of signals to the user equipment;
receives reports of the quality of the received signal for each of the plurality of signals from the user equipment; and
performs the identifying plural frequency sub-band and beam pairings for which the received signal quality is correlated, evaluating the periodicity of the received signal quality analysis process, and determining to adjust the periodicity, based on the received reports.

13. The method of claim 1, wherein the user equipment:
receives the plurality of signals from the base station and measures the quality of the received signal for each of the plurality of signals;
performs the steps of identifying plural frequency sub-band and beam pairings for which the received signal quality is correlated, evaluating the periodicity of the received signal quality analysis process, and determining to adjust the periodicity, based on received reports; and
sends a signal to the base station indicating the plural frequency sub-band and beam pairings for which the received signal quality is correlated, and the results of the determination as to adjust the periodicity.

14. The method of claim 1, wherein multiple groups of plural frequency sub-band and beam pairings for which the received signal quality is correlated are identified based on the signals transmitted by the base station to the user equipment.

15. The method of claim 1, wherein the received signal quality analysis process for a given frequency sub-band and beam pairing comprises:
transmitting one or more signals from the base station to the user equipment using the given frequency sub-band and beam pairing and receiving the signals at the user equipment;
measuring the quality of the received signals by the user equipment; and
sending the received signal quality measurements to the base station.

16. The method of claim 1, wherein the wireless communication system is a 5G wireless communication system.

17. A base station for a wireless communication system that utilises beamforming, the base station comprising processing circuitry and a non-transitory machine-readable medium storing instructions which configure the base station to:
transmit a plurality of signals to a user equipment, each signal being transmitted by the base station utilising a frequency sub-band and beam pairing that is different to the frequency sub-band and beam pairings used by the other signals among the plurality of signals;
receive reports of a quality of a received signal for each of the plurality of signals from the user equipment;
identify plural frequency sub-band and beam pairings for which the received signal quality is correlated;
for each frequency sub-band and beam pairing within a group of plural frequency sub-band and beam pairings for which the received signal quality is correlated, evaluate periodicity of the received signal quality analysis process, and determine whether or not to adjust the periodicity of the received signal quality analysis process based on a determination of a correlation between the frequency sub-band and beam pairings; and adjust the periodicity of the received signal quality analysis process by:
selecting the frequency sub-band and beam pairing which is representative of the plural frequency sub-band and beam pairings in the group for which the received signal quality is correlated;
one of maintaining and reducing the time interval between measuring periods including received signal quality analysis processes for the selected representative frequency sub-band and beam pairing; and
one of:
increasing a time interval between measuring periods including received signal quality analysis processes for the plural frequency sub-band and beam pairings in the group other than the selected representative frequency sub-band and beam pairing; and
stopping the received signal quality analysis processes for the plural frequency sub-band and beam pairings in the group other than the selected representative frequency sub-band and beam pairing.

18. The base station of claim 17, configured to identify the correlated received signal qualities for the plural frequency and sub-band pairings by:
receiving measurements of the received signal quality of the plural frequency and sub-band pairings over plural measuring periods from the user equipment;
calculating a mean received signal quality for each frequency and sub-band pairing among the plural frequency and sub-band pairings; and
comparing the calculated mean received signal qualities for the plural frequency and sub-band pairings to identify correlated mean received signal qualities.

19. The base station of claim 18, configured to identify received signal qualities for the plural frequency and sub-band pairings as being correlated when the mean received signal qualities are within a given standard deviation value of each other.

20. A user equipment for a wireless communication system that utilises beamforming, the user equipment comprising processing circuitry and a non-transitory machine-readable medium storing instructions which configure the user equipment:
receive, from a base station, a plurality of signals, each signal being transmitted by the base station utilising a frequency sub-band and beam pairing that is different to the frequency sub-band and beam pairings used by the other signals among the plurality of signals;
measure a quality of the received signal for each of the plurality of signals;
identify plural frequency sub-band and beam pairings for which the received signal quality is correlated;
for each frequency sub-band and beam pairing within a group of plural frequency sub-band and beam pairings for which the received signal quality is correlated, evaluate periodicity of the received signal quality analysis process, and determine whether or not to adjust the periodicity of the received signal quality analysis process based on a determination of a correlation between the frequency sub-band and beam pairings; and
adjust the periodicity of the received signal quality analysis process by:
selecting the frequency sub-band and beam pairing which is representative of the plural frequency sub-band and beam pairings in the group for which the received signal quality is correlated;
one of maintaining and reducing a time interval between measuring periods including received signal quality analysis processes for the selected representative frequency sub-band and beam pairing; and one of:
- increasing the time interval between measuring periods including received signal quality analysis processes for the plural frequency sub-band and beam pairings in the group other than the selected representative frequency sub-band and beam pairing; and
- stopping the received signal quality analysis processes for the plural frequency sub-band and beam pairings in the group other than the selected representative frequency sub-band and beam pairing.

* * * * *